(12) United States Patent
Kashu

(10) Patent No.: US 11,823,428 B2
(45) Date of Patent: Nov. 21, 2023

(54) IMAGE PROCESSING APPARATUS AND CONTROL METHOD THEREFOR, IMAGE CAPTURING APPARATUS, AND STORAGE MEDIUM

(71) Applicant: CANON KABUSHIKI KAISHA, Tokyo (JP)

(72) Inventor: Ryota Kashu, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 353 days.

(21) Appl. No.: 17/173,810

(22) Filed: Feb. 11, 2021

(65) Prior Publication Data

US 2021/0256306 A1   Aug. 19, 2021

(30) Foreign Application Priority Data

Feb. 19, 2020   (JP) .................................. 2020-026474
Dec. 24, 2020   (JP) .................................. 2020-215656

(51) Int. Cl.
| | | |
|---|---|---|
| *G06V 10/25* | (2022.01) | |
| *G06T 7/246* | (2017.01) | |
| *G06V 10/772* | (2022.01) | |
| *G06F 18/28* | (2023.01) | |
| *G06F 18/24* | (2023.01) | |
| *G06F 18/25* | (2023.01) | |
| *G06F 18/40* | (2023.01) | |
| *G06F 18/20* | (2023.01) | |
| *H04N 23/61* | (2023.01) | |
| *H04N 23/67* | (2023.01) | |

(52) U.S. Cl.
CPC .............. *G06V 10/25* (2022.01); *G06F 18/24* (2023.01); *G06F 18/25* (2023.01); *G06F 18/28* (2023.01); *G06F 18/285* (2023.01); *G06F 18/40* (2023.01); *G06T 7/248* (2017.01); *G06V 10/772* (2022.01); *H04N 23/61* (2023.01); *H04N 23/675* (2023.01)

(58) Field of Classification Search
CPC ...... G06V 10/25; G06V 10/772; G06T 7/248; H04N 23/61; G06F 18/25; G06F 18/24; G06F 18/285; G06F 18/40; G06F 18/28
USPC ........................................................ 348/169
See application file for complete search history.

(56) References Cited

U.S. PATENT DOCUMENTS

2011/0091116 A1\* 4/2011 Yano ..................... G06V 10/443
382/209
2011/0091117 A1\* 4/2011 Sakamoto ............ G06V 10/443
382/218

FOREIGN PATENT DOCUMENTS

JP   2010-154438 A   7/2010

\* cited by examiner

*Primary Examiner* — Jeffery A Williams
*Assistant Examiner* — Kristin Dobbs
(74) *Attorney, Agent, or Firm* — CANON U.S.A., INC. IP Division

(57) ABSTRACT

An apparatus comprises a storage device configured to store a plurality of dictionary data for respectively detecting a plurality of different objects from an image; and at least one processor configured to function as: a detection unit configured to use partial dictionary data of the plurality of dictionary data to detect an object corresponding to the partial dictionary data, with respect to each frame of an image of a plurality of frames obtained by an image capturing device; and a switching unit configured to switch the dictionary data to be used by the detection unit in the plurality of frames, according to a result of the object detection by the detection unit.

18 Claims, 22 Drawing Sheets

FIG. 6A

| DICTIONARY DATA | PERSON | DOG | CAT | BIRD | FOUR-WHEELED | 2-WHEELED |
|---|---|---|---|---|---|---|
| DETECTION AREA | FACE | FACE | FACE | FACE | ENTIRE | ENTIRE |

| DETECTOR | 1 UNIT |
|---|---|
| DETECTION FREQUENCY PER FRAME | 3 TIMES |

FIG. 6B

[frame/DETECTION]

| | DICTIONARY DATA | | | | | |
|---|---|---|---|---|---|---|
| DETECTED MAIN OBJECT | PERSON | DOG | CAT | BIRD | FOUR-WHEELED | 2-WHEELED |
| NONE | 2 | 2 | 2 | 2 | 2 | 2 |
| PERSON | 1 | 2 | 2 | 2 | 2 | 2 |
| DOG | 2 | 1 | 2 | 2 | 2 | 2 |
| CAT | 2 | 2 | 1 | 2 | 2 | 2 |
| BIRD | 2 | 2 | 2 | 1 | 2 | 2 |
| FOUR-WHEELED | 2 | 2 | 2 | 2 | 1 | 2 |
| 2-WHEELED | 2 | 2 | 2 | 2 | 2 | 1 |

F I G. 8A

| TYPE OF OBJECT | PERSON | DOG | CAT | BIRD | FOUR-WHEELED | 2-WHEELED |
|---|---|---|---|---|---|---|
| DICTIONARY DATA | FACE | WHOLE BODY /FACE | WHOLE BODY /FACE | WHOLE BODY /FACE | ENTIRE | ENTIRE |
| LOCAL DICTIONARY DATA | PUPIL | PUPIL | PUPIL | PUPIL | — | — |

| DETECTOR | 1 UNIT |
|---|---|
| DETECTION FREQUENCY PER FRAME | 3 TIMES |

FIG. 8B

DICTIONARY DATA [frame/DETECTION]

| DETECTED MAIN OBJECT | PERSON | DOG | CAT | BIRD | FOUR-WHEELED | 2-WHEELED |
|---|---|---|---|---|---|---|
| NONE | 2 | 2 | 2 | 2 | 2 | 2 |
| PERSON | 1 | 4 | 4 | 4 | 4 | 4 |
| DOG | 4 | 1 | 4 | 4 | 4 | 4 |
| CAT | 4 | 4 | 1 | 4 | 4 | 4 |
| BIRD | 4 | 4 | 4 | 1 | 4 | 4 |
| FOUR-WHEELED | 2 | 2 | 2 | 2 | 1 | 2 |
| 2-WHEELED | 2 | 2 | 2 | 2 | 2 | 1 |

LOCAL DICTIONARY DATA [frame/DETECTION]

| DETECTED MAIN OBJECT | PERSON/PUPIL | DOG/PUPIL | CAT/PUPIL | BIRD/PUPIL |
|---|---|---|---|---|
| NONE | 0 | 0 | 0 | 0 |
| PERSON | 1 | 0 | 0 | 0 |
| DOG | 0 | 1 | 0 | 0 |
| CAT | 0 | 0 | 1 | 0 |
| BIRD | 0 | 0 | 0 | 1 |
| FOUR-WHEELED | 0 | 0 | 0 | 0 |
| 2-WHEELED | 0 | 0 | 0 | 0 |

FIG. 10A

| DETECTED OBJECT | DICTIONARY DATA [frame/DETECTION] | | | | | |
|---|---|---|---|---|---|---|
| | PERSON | DOG | CAT | BIRD | FOUR-WHEELED | 2-WHEELED |
| NONE | 2 | 2 | 2 | 2 | 2 | 2 |
| PERSON | 5 | 3 | 3 | 3 | 3 | 3 |
| DOG | 4 | 5 | 3 | 2 | 1 | 1 |
| CAT | 4 | 3 | 5 | 2 | 1 | 1 |
| BIRD | 4 | 2 | 2 | 5 | 1 | 1 |
| FOUR-WHEELED | 4 | 1 | 1 | 1 | 5 | 3 |
| 2-WHEELED | 4 | 1 | 1 | 1 | 3 | 5 |

FIG. 10B

| DETECTED OBJECT | DICTIONARY DATA [frame/DETECTION] | | | | | |
|---|---|---|---|---|---|---|
| | PERSON | DOG | CAT | BIRD | FOUR-WHEELED | 2-WHEELED |
| NONE | 2 | 2 | 2 | 2 | 2 | 2 |
| PERSON | 1 | 4 | 4 | 4 | 4 | 4 |
| DOG | 2 | 1 | 3 | 3 | 0 | 0 |
| CAT | 4 | 4 | 1 | 4 | 0 | 0 |
| BIRD | 4 | 4 | 4 | 1 | 0 | 0 |
| FOUR-WHEELED | 1 | 3 | 3 | 0 | 1 | 3 |
| 2-WHEELED | 1 | 3 | 3 | 0 | 3 | 1 |

FIG. 12B
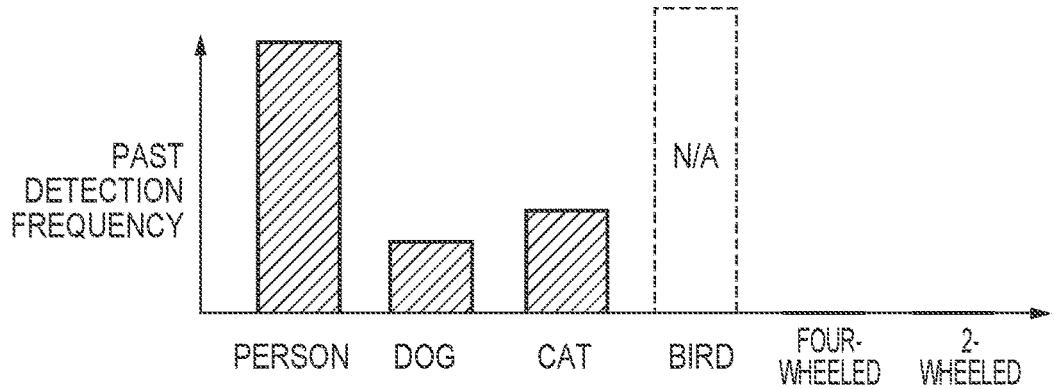
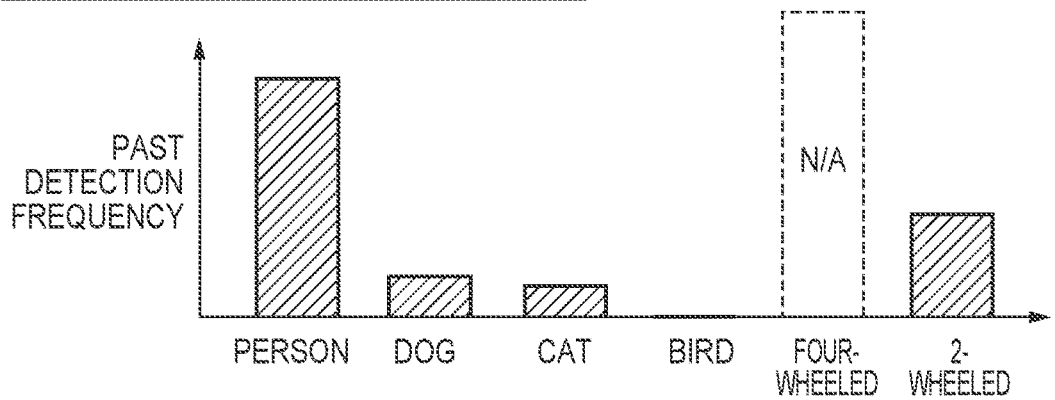
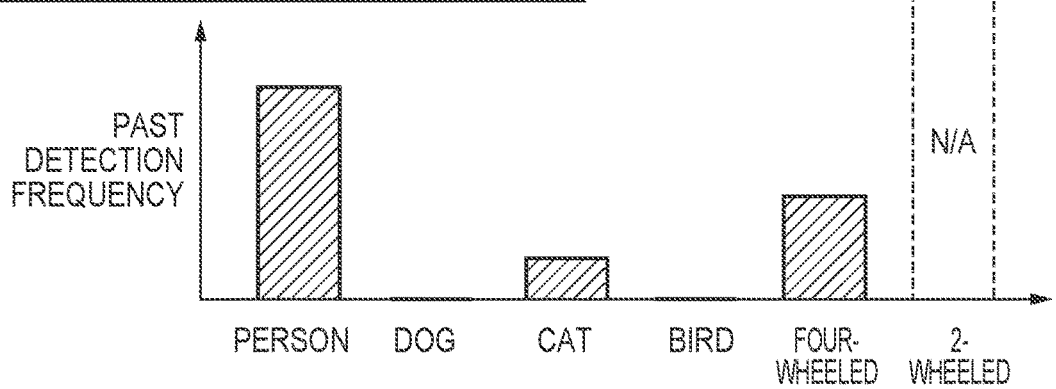

F I G. 13

| DETECTED MAIN OBJECT | DICTIONARY DATA | | | | | | [frame/DETECTION] |
|---|---|---|---|---|---|---|---|
| | PERSON | DOG | CAT | BIRD | FOUR-WHEELED | 2-WHEELED |
| NONE | 2 | 2 | 2 | 2 | 2 | 2 |
| PERSON | 1 | 3 | 3 | 3 | 6 | 6 |
| DOG | 2 | 1 | 3 | 3 | 0 | 0 |
| CAT | 4 | 4 | 1 | 4 | 8 | 8 |
| BIRD | 2 | 4 | 4 | 1 | 0 | 0 |
| FOUR-WHEELED | 1 | 3 | 3 | 0 | 1 | 3 |
| 2-WHEELED | 1 | 0 | 2 | 0 | 2 | 1 |

IMAGE PROCESSING APPARATUS AND CONTROL METHOD THEREFOR, IMAGE CAPTURING APPARATUS, AND STORAGE MEDIUM

BACKGROUND OF THE DISCLOSURE

Field of the Disclosure

The aspect of the embodiments relates to an object detection technology in an image processing apparatus and an image capturing apparatus.

Description of the Related Art

Conventionally, products provided with a tracking AF mode that detects people's faces and pupils from images that are continuously output from an image sensor, and continually optimizes the focus state and the exposure state of the detected face or pupil have been implemented in digital cameras and the like.

Also, in recent years, it has become possible to detect not only people's faces and pupils but various types of objects, using a machine learning technique (Japanese Patent Laid-Open No. 2010-154438). With this technique, detection of specific objects is performed by inputting images to a detector together with dictionary data obtained by learning the object to be detected. By changing the dictionary data input to the detector, it is possible to detect different types of objects from within an image.

When the types of objects to be detected increase, the types of corresponding dictionary data also increases. In devices such as digital cameras in which the number of arithmetic logic circuits constituting detectors and the processing capacity thereof are limited, a control method that realizes detection of a plurality of types of objects by switching the dictionary data every frame is conceivable. Note that, here, one frame represents a period or cycle from execution to completion of computational processing and camera control on an image that is output by the image sensor.

However, with only a control method that switches dictionary data every frame of images that are output, detected objects can no longer be detected in frames in which dictionary data corresponding to the detected objects is not input. There is thereby an issue in that stable tracking of objects can no longer be performed.

SUMMARY OF THE DISCLOSURE

According to a first aspect of the embodiments, there is provided an apparatus comprising: a storage device configured to store a plurality of dictionary data for respectively detecting a plurality of different objects from an image; and at least one processor configured to function as: a detection unit configured to use partial dictionary data of the plurality of dictionary data to detect an object corresponding to the partial dictionary data, with respect to each frame of an image of a plurality of frames obtained by an image capturing device; and a switching unit configured to switch the dictionary data to be used by the detection unit in the plurality of frames, according to a result of the object detection by the detection unit.

According to a second aspect of the embodiments, there is provided an apparatus comprising: an image capturing device configured to capture an image; and an image processing apparatus including: a storage device configured to store a plurality of dictionary data for respectively detecting a plurality of different objects from an image; and at least one processor configured to function as: a detection unit configured to use partial dictionary data of the plurality of dictionary data to detect an object corresponding to the partial dictionary data, with respect to each frame of an image of a plurality of frames obtained by an image capturing device; and a switching unit configured to switch the dictionary data to be used by the detection unit in the plurality of frames, according to a result of the object detection by the detection unit.

According to a third aspect of the embodiments, there is provided a method comprising: using partial dictionary data of a plurality of dictionary data for respectively detecting a plurality of different objects from an image to detect an object corresponding to the partial dictionary data, with respect to each frame of an image of a plurality of frames obtained by an image capturing device; and switching the dictionary data to be used in the detection in the plurality of frames, according to a result of the object detection in the detection.

Further features of the disclosure will become apparent from the following description of exemplary embodiments with reference to the attached drawings.

BRIEF DESCRIPTION OF THE DRAWINGS

FIGS. 6A and 6B are diagrams showing an example of the detection cycles of respective dictionary data.

FIGS. 8A and 8B are diagrams showing an example of the detection cycles of respective dictionary data in the case where local dictionary data is defined.

FIGS. 10A and 10B are diagrams showing an example of a dictionary data priority table and detection cycles in a second embodiment.

FIGS. 12A and 12B are diagrams showing object detection frequency data in a third embodiment.

FIG. 13 is a diagram showing an example of the detection cycles of dictionary data in the third embodiment.

DESCRIPTION OF THE EMBODIMENTS

Figure 1:
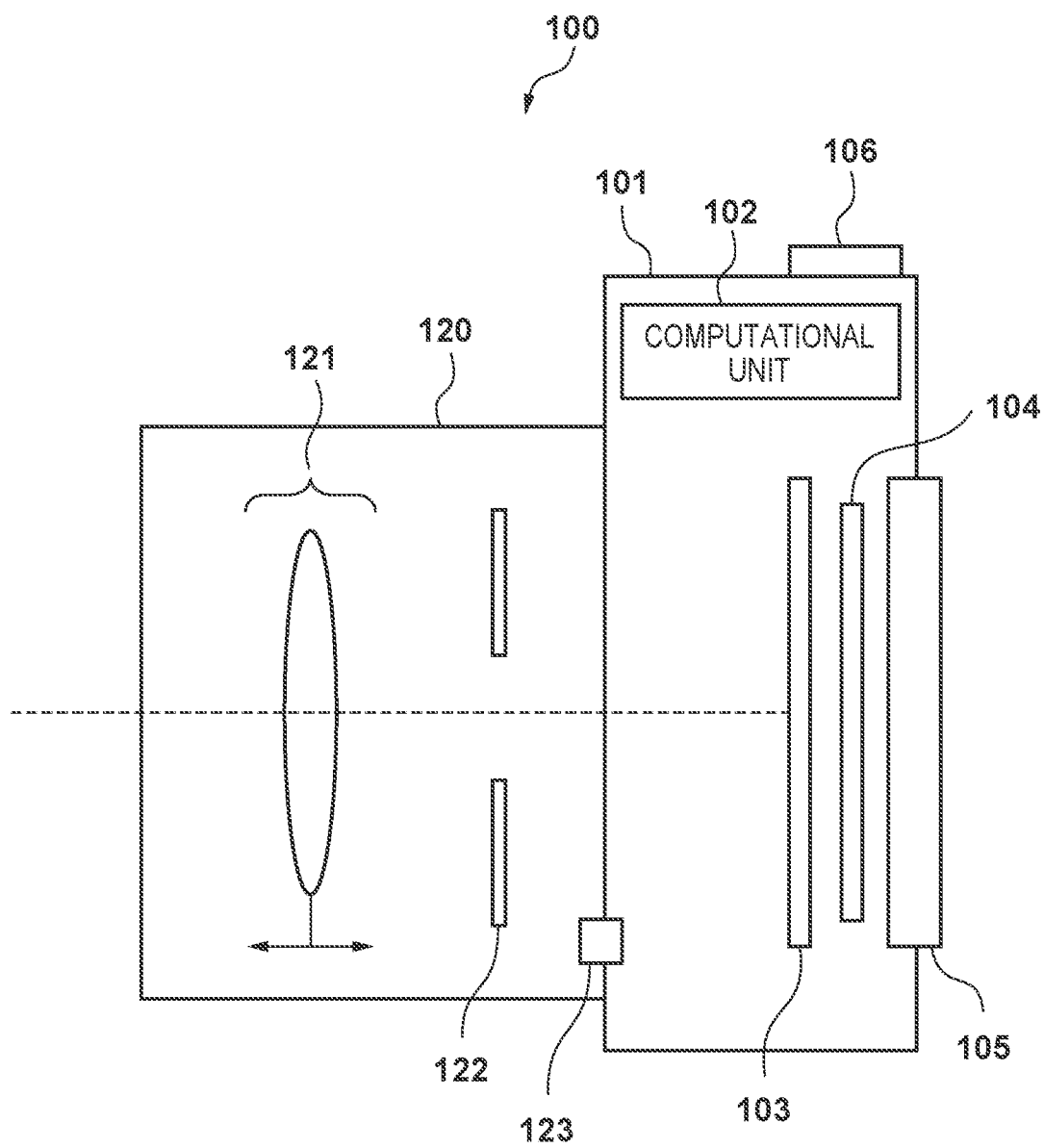
FIG. 1 is a sectional side view showing the configuration of a digital SLR camera serving as a first embodiment of an image capturing apparatus of the disclosure.

Hereinafter, embodiments of the disclosure will be described in detail with reference to the attached drawings. It should be noted that the following embodiments are not intended to limit the disclosure related to the claims. While a plurality of features are described in the embodiments, not all of these features are necessarily essential to the disclosure, and a plurality of features can also be combined as appropriate. Furthermore, the same reference numerals are given to constituent elements that are the same or similar in the attached drawings, and overlapping description thereof will be omitted.

First Embodiment

Figure 2:
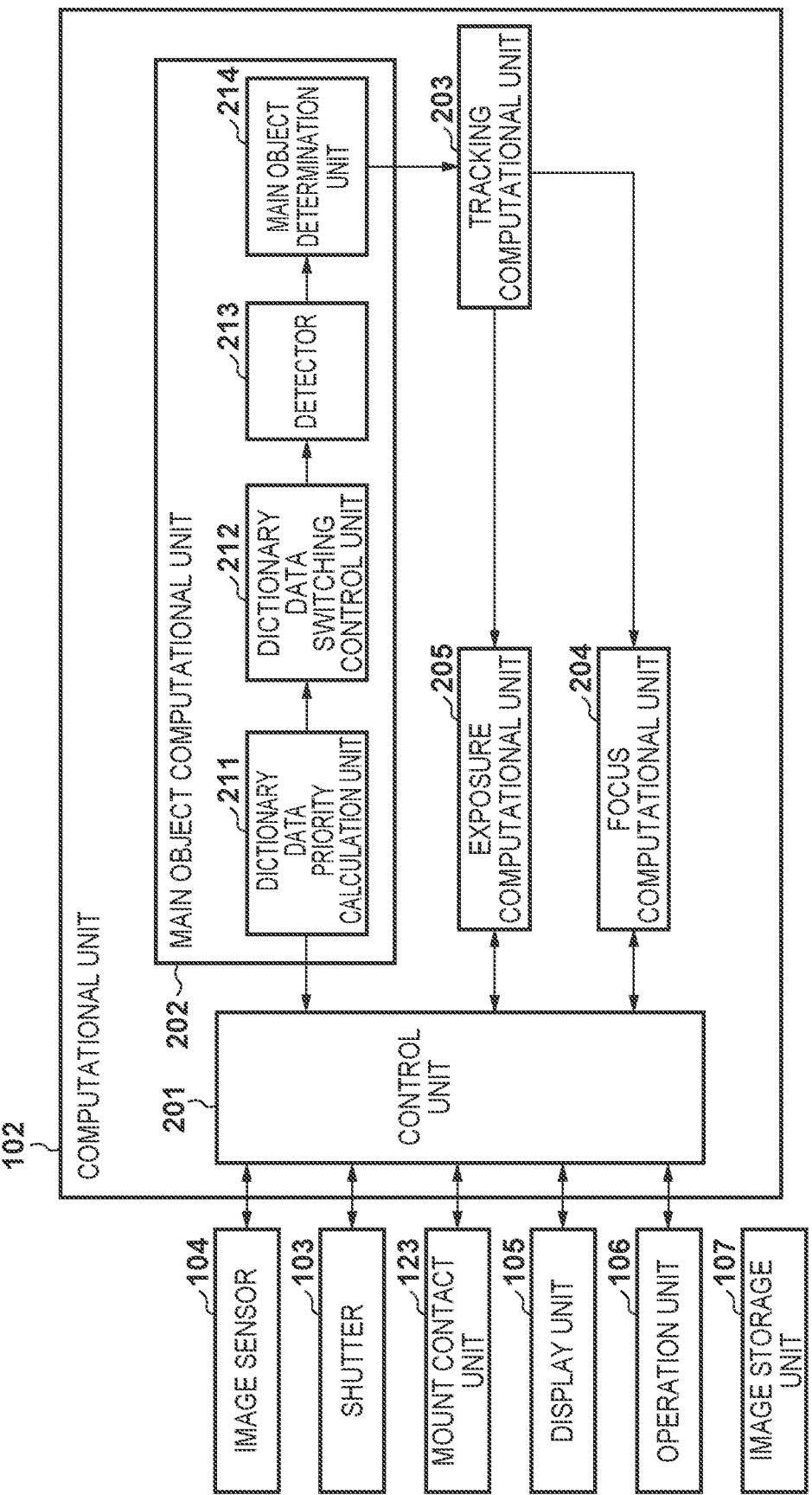
FIG. 2 is a block diagram of a control system of the image capturing apparatus.

FIG. 1 is a sectional side view showing the configuration of a digital single-lens reflex camera (hereinafter, also simply camera) 100 serving as a first embodiment of an image capturing apparatus of the disclosure. FIG. 2 is a block diagram showing the electrical configuration of the camera 100 in FIG. 1.

In the camera 100 of the present embodiment, as shown in FIG. 1, an interchangeable lens unit 120 is removably mounted on the front side (object side) of a camera body 101. The lens unit 120 includes a focus lens 121 and a diaphragm 122, and is electrically connected to the camera body 101 via a mount contact unit 123. It is thereby possible to adjust the amount of light entering the camera body 101 and the focal position. Note that a user can also manually adjust the focus lens 121.

An image sensor 104 is constituted by a CCD sensor, a CMOS sensor or other such sensor, and includes an infrared cut filter, a low pass filter or other such filter. The image sensor 104 photoelectrically converts an object image formed by light that passes through an image capturing optical system of the lens unit 120 when shooting is performed, and transmits a signal for generating a shot image to a computational unit 102. The computational unit 102 generates a shot image from the received signal, and saves the generated image to an image storage unit 107, together with displaying the generated image on a display unit 105 such as an LCD. A shutter 103 shades the image sensor 104 when shooting is not being performed, and opens to expose the image sensor 104 when shooting is performed.

Next, the configuration related to control will be described using FIG. 2. The computational unit 102 is provided with a dedicated circuit for executing specific computational processing at high speed, in addition to a RAM, a ROM and a multi-core CPU that is able to perform parallel processing of multiple tasks. Due to such hardware, the computational unit 102 constitutes a control unit 201, a main object computational unit 202, a tracking computational unit 203, a focus computational unit 204, and an exposure computational unit 205. The control unit 201 controls the various parts of the camera body 101 and the lens unit 120.

The main object computational unit 202 is constituted to be provided with a dictionary data priority calculation unit 211, a dictionary data switching control unit 212, a detector 213, and a main object determination unit 214. The detector 213 performs processing for detecting a specific area (e.g., person's face or pupil, dog's face or pupil) from an image. There are times when no specific areas are detected and times when a plurality of specific areas are detected. As for the detection technique, any known method such as AdaBoost or a convolutional neural network are be used. Also, as for the mode of implementing the method, a program that runs on a CPU, dedicated hardware, or a combination thereof may be used. Also, the type of detection object can be changed by switching the dictionary data that is input to the detector 213.

Dictionary data is data in which features of corresponding objects are registered, for example, and control commands for the logic circuits are defined for every object type. In the present embodiment, dictionary data for every object is stored by a ROM within the computational unit 102 (a plurality of types of dictionary data is stored). Because dictionary data exists for every type of object and specific area, objects of different types can be detected, by switching dictionary data. For example, the dictionary data priority calculation unit 211 calculates the priority of dictionary data every predetermined period such as every frame, and, based on the computation result, the dictionary data switching control unit 212 determines dictionary data to be input to the detector 213. The object detection result that is obtained by the detector 213 is sent to the main object determination unit 214, and a main object area in which the main object is determined, out of the detected objects, is set. The determination of the main object is performed using a known calculation method depending on size, position, and reliability of the detection result, and other such variables. In the case where an object or a specific area is not detected with the detector 213, the main object area to serve as the main object is determined based on past detection results, feature amounts such as edges in a target frame, the object distance or other such values.

In the present embodiment, a detector that performs object detection by CNN (convolutional neural network) is used for the detector 213, and dictionary data that is used by the detector in detecting each object is a learned parameter generated in advance using machine learning of a CNN in an external device (PC) or the image capturing apparatus 100.

Machine learning of a CNN can be performed by any technique. For example, a predetermined computer such as a server may perform machine learning of a CNN, and the image capturing apparatus 100 may acquire the learned CNN from the predetermined computer. For example, learning of a CNN by an object detection unit may be performed, by a predetermined computer performing supervised learning with image data for use in learning as an input and with the position of an object corresponding to the image data for use in learning as supervised data. Also, learning of a CNN by a dictionary estimation unit may be performed, by a predetermined computer performing supervised learning with image data for use in learning as an input and with dictionary data corresponding to an object in the image data for use in learning as supervised data. Learned parameters of a CNN are generated in the manner described above. Learning of a CNN may be performed by the image capturing apparatus 100 or the image processing apparatus described above.

While having the processing capacity to detect a plurality of types of object in one frame, the detector 213 that is used in the present embodiment does not always perform detection of all of the types of objects targeted for detection by the camera of the present embodiment. That is, although the present embodiment does not necessarily restrict the processing capacity of the detector 213, detection of a plurality of types of objects that is fewer than the total number is applied by switching the dictionary in accordance with settings determined in advance in order to save on processing speed, bus band and the like.

The tracking computational unit 203 tracks the main object area, based on detection information of the main object. The focus computational unit 204 calculates control values of the focus lens 121 for focusing on the main object area. Also, the exposure computational unit 205 calculates control values of the diaphragm 122 and the image sensor 104 for correctly exposing the main object area.

An operation unit 106 is provided with a shutter release switch, a mode dial and the like, and the control unit 201 is able to receive shooting instructions, mode change instructions and other such instructions from the user through the operation unit 106. Thus completes description of the configuration of the camera 100 according to the first embodiment of the disclosure.

Figure 3:
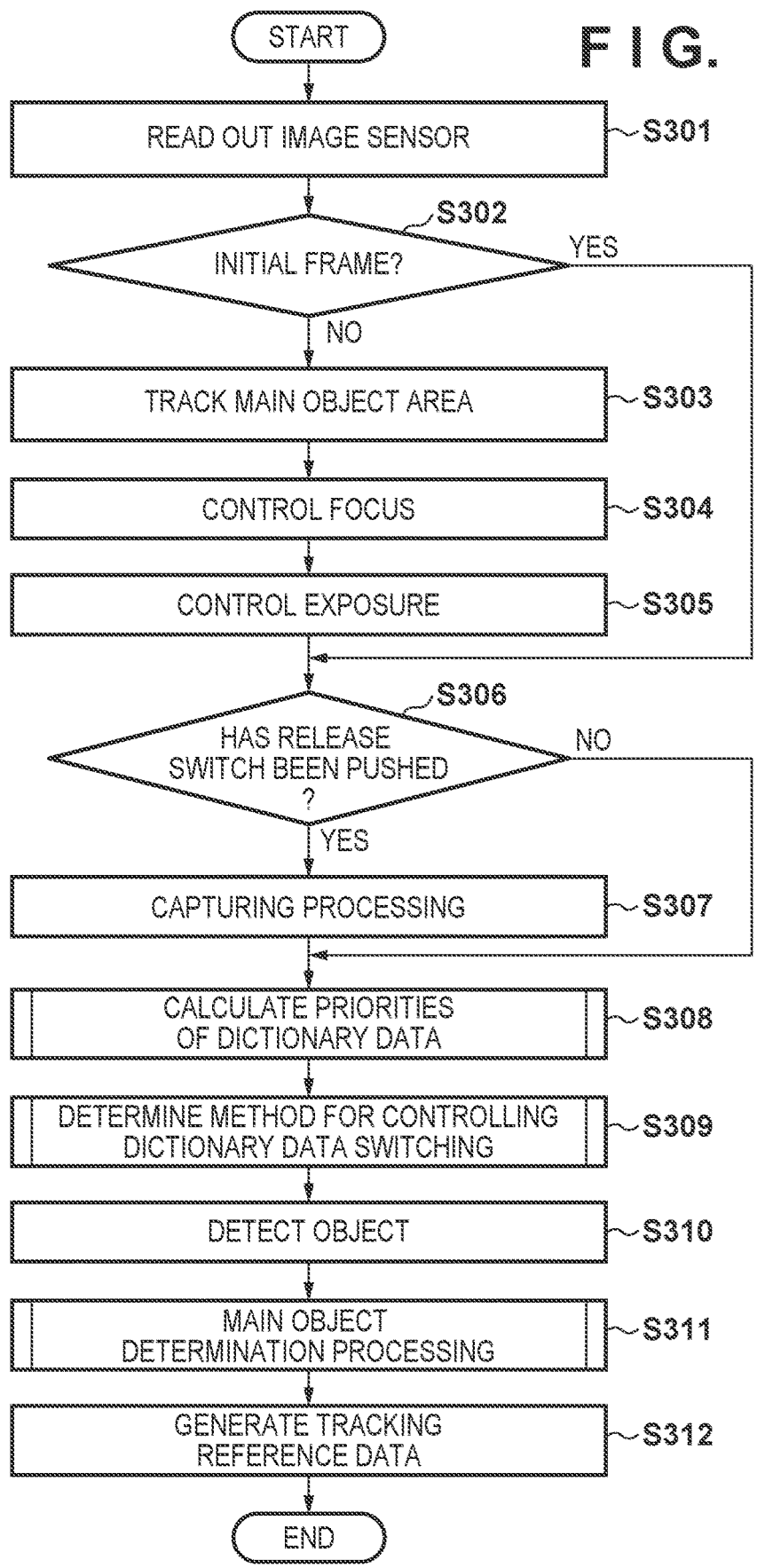
FIG. 3 is a flowchart illustrating operations on one frame by the image capturing apparatus.

Next, the operations on one frame of the camera 100 in the present embodiment will be described, with reference to FIG. 3. Operations of the flowchart in FIG. 3 is repeatedly executed every frame.

In step S301, the control unit 201 performs readout processing of pixel signals from the image sensor 104. Image data is generated from the read pixel signals. After the pixel signals and the generated image data is saved to the RAM, the processing advances to step S302.

In step S302, the processing only advances to step S306 at the time of initial frame processing. If this is not the case, the processing advances to step S303.

In step S303, the tracking computational unit 203 performs tracking processing for calculating the position, in the current frame, of the main object area set in the previous frame, using tracking reference information generated in step S310, which will be described later, in the previous frame. As for the algorithm that is used in tracking processing, any known method can be used. For example, tracking processing can be performed by searching the current frame for an area where the distance between feature amounts is short, with feature amounts extracted by a predetermined feature extraction means from the main object area set in the previous frame as tracking reference information. Also, as for the mode of implementing the algorithm, a program that runs on a CPU, dedicated hardware, or a combination thereof may be used. After tracking processing is completed, the tracking result (position and size of the main object area in the current frame) is saved to the RAM within the computational unit 102, and the processing advances to step S304.

In step S304, the focus computational unit 204 uses the tracking result generated in step S303, the signal information and image data generated in step S301 and the like to calculates control values of the focus lens 121 such that the tracking result is in focus. As for the method of calculating the control values of the focus lens, any known methods such as a contrast system or a phase difference detection method can be used. When calculation of the control values of the focus lens is completed, the focus computational unit 204 notifies the control values of the focus lens to the control unit 201. The control unit 201 controls the focus lens 121, through the mount contact unit 123, based on the notified control values. After the above processing has ended, the processing advances to step S305.

In step S305, the exposure computational unit 205 uses the tracking result generated in step S303 and the signal information and image data generated in step S301 to calculate control values of the control values of the image sensor 104 and the diaphragm 122, such that the tracking result will be correctly exposed. As for the method of calculating the control values of the image sensor 104 and the diaphragm 122, any known methods can be used. When calculation of the control values of the image sensor 104 and the diaphragm 122 is completed, the exposure computational unit 205 notifies the control values of the image sensor 104 and the diaphragm 122 to the control unit 201. The control unit 201 controls the image sensor 104 and controls the diaphragm 122 through the mount contact unit 123, based on the notified control values of the image sensor 104 and the diaphragm 122. After completing the above processing, the processing advances to step S306.

In step S306, the control unit 201 reads the state of the operation unit 106, and if the shutter release switch has been pushed, the processing advances to step S307. If this is not the case, the processing advances to step S308.

In step S307, the control unit 201 performs processing for capturing a still image. The shutter 103 is driven based on the control values calculated in step S305, and the image sensor 104 is exposed. Image data is generated from the pixel signals read out from the exposed image sensor 104. The generated image data is saved to an external storage medium such as an SD card. After the above processing ends, the processing advances to step S308.

The priorities of respective dictionary data are calculated in step S308. This processing will be described in detail later using FIG. 4. Next, the processing advances to step S309.

In step S309, the method for controlling dictionary data switching is determined, based on the calculated priorities of the respective dictionary data. This processing will be described in detail later using FIG. 5. Next, the processing advances to step S310.

In step S310, the image data and dictionary data generated in step S301 are input to the detector 213, and a specific area of the object corresponding to dictionary data is detected. The dictionary data that is input depends on the dictionary data switching control method determined in step S309. Next, the processing advances to step S311.

In step S311, the main object area is determined by the aforementioned method, for example, from the detection result obtained in step S310. The determination of the main object area is performed using a known calculation method utilizing the region (e.g., whole body, face, pupil, etc.), size and position of the detection result, the reliability of the detection result and the like. When information on the determined main object area is saved to the RAM within the computational unit 102, the processing advances to step S312.

In step S312, the tracking computational unit 203 generates tracking reference information for use in the tracking processing of the next frame performed in step S303, based on the information on the main object area generated in step S311 and the image data generated in step S301. The generated tracking reference information is then saved to the RAM within the computational unit 102.

The operations on one frame of the camera 100 end when step S312 ends. As long as the camera 100 continues operating, the processing returns to step S301 and the processing described heretofore is repeated. Thus completes description of the operations on one frame of the camera 100 in the present embodiment.

Next, a method of calculating the priorities of dictionary data in step S308 of FIG. 3 will be described using FIG. 4.

In step S400, the priorities of the respective dictionary data that were set in the previous frame are initialized.

In step S401, it is determined whether a main object area was output in the previous frame, with reference to the main object area information that is saved in the RAM within the computational unit 102. If a main object area is detected, the processing advances to step S402, and if no objects are detected, the processing advances to step S405.

In step S402, the priority of the dictionary data corresponding to the main object detected in the previous frame is set to "high". In FIG. 4, the priorities of dictionary data are set to two levels "high" and "low". The priority setting method differs depending on the amount of dictionary data and the processing capacity (types, frequency detectable per frame) of the detector.

In step S403, it is determined whether local dictionary data is defined for the main object. Depending on the object, an entire area or a local area that is part of the entire area is defined as the detection area. Specifically, relationships such as the following, for example.

(for people) entire area: face local area: pupil
(for dogs) entire area: whole body/face local area: pupil In the present embodiment, detection of a local area (specific area) based on the above dictionary data is not performed from the entire shot image but rather by an image obtained by cutting out a portion that includes the entire area of the detected object and a vicinity thereof from the original shot image being input to the detector 213. In other words, if the target object is a person, a pupil serving as a local area is first detected after a person's face is detected. If there is corresponding local dictionary data, the processing advances to step S404, and if there is no local dictionary data, the processing advances to step S405.

In step S404, the priority of the local dictionary data corresponding to the main object is set to "high", and the processing advances to step S405.

In step S405, it is determined whether there is dictionary data whose priority has not been determined. If there is dictionary data whose priority has not been determined, the processing advances to step S406, and if there is not, the process for calculating the priority of dictionary data of step S308 ends.

In step S406, the priority of dictionary data whose priority has not been determined is set to "low".

Next, the method of determining the dictionary data switching control method in step S309 of FIG. 3 will be described using FIG. 5.

In step S500, the detection cycles of respective dictionary data that were determined in the previous frame are initialized. Here, the detection cycle is a parameter [frame/detection] representing the number of frames per detection result acquisition. Also, the unit of the detection cycle is not limited thereto, and may be set by time [ms/detection], for example. Also, the method of setting dictionary data to be used by the detector 213 in object detection with respect to a plurality of frames is not limited to the above. For example, a plurality of methods may be stored in advance in the ROM within the computational unit 102, in the form of data tables indicating the combinations of dictionary data to be used by the detector 213 in respective frames. The control unit 201 selects a table according to settings (people priority, animal (dog, cat, bird) priority, vehicle (two-wheeled, four-wheeled) priority, etc.) configured by the user as to which object to detect as object detection, for example, and extracts the selected table to the RAM. The detector 213 refers to dictionary data in order of the tables stored in the RAM, and performs detection of objects corresponding to the respective dictionary data. A table indicating the input order of dictionary data extracted to the RAM is rewritten as required according to the detection state of objects. For example, in order to next detect the pupil of a bird in response to a bird being detected as the specific object, the table is rewritten such that dictionary data corresponding to the pupil of a bird is detected.

In step S501, it is determined whether there is "high" priority dictionary data whose detection cycle has not been set. If there is such dictionary data, the processing advances to step S502, and the detection cycle of the dictionary thereof is set to 1 [frame/detection] (select as dictionary data for acquiring per frame detection results). Steps S501 and S502 are repeatedly executed until a detection cycle is set for all "high" priority dictionary data. Next, the processing advances to step S503.

In step S503, the detection cycle of the remaining "low" priority dictionary data is set to a plurality of frames. A specific example of the detection cycle of "low" priority dictionary data will be described later using FIGS. 6A and 6B and FIG. 7. Next, the processing advances to step S504.

In step S504, the control schedule of dictionary data is determined, based on the detection cycles of respective dictionary data determined in the preceding steps and the detection frequency per frame. A specific example of the control schedule of dictionary data will be described later using FIGS. 6A and 6B and FIG. 7.

Next, a specific example of control of dictionary data will be described using FIGS. 6A and 6B and FIG. 7. Types of dictionary data, detection areas, and processing restrictions on the detector in a control case example envisaged in the present embodiment are shown in FIG. 6A. In the present embodiment, six types are prepared as dictionary data, in order to detect objects classified as person, dog, cat, bird, four-wheeled, and two-wheeled. In the present embodiment, the number of logic circuit blocks serving as detectors is one and detection can be performed three times in the time taken for one frame of image signals to be processed. That is, it is possible to process three types of dictionaries per frame. Four-wheeled indicates dictionary data for detecting four-wheeled vehicles, with racing cars such as rally cars or typical passenger cars provided with four wheels, for example, being included as vehicles. Also, two-wheeled indicates dictionary data for detecting two-wheeled vehicles, motorbikes and bicycles being included as vehicles.

Figure 4:
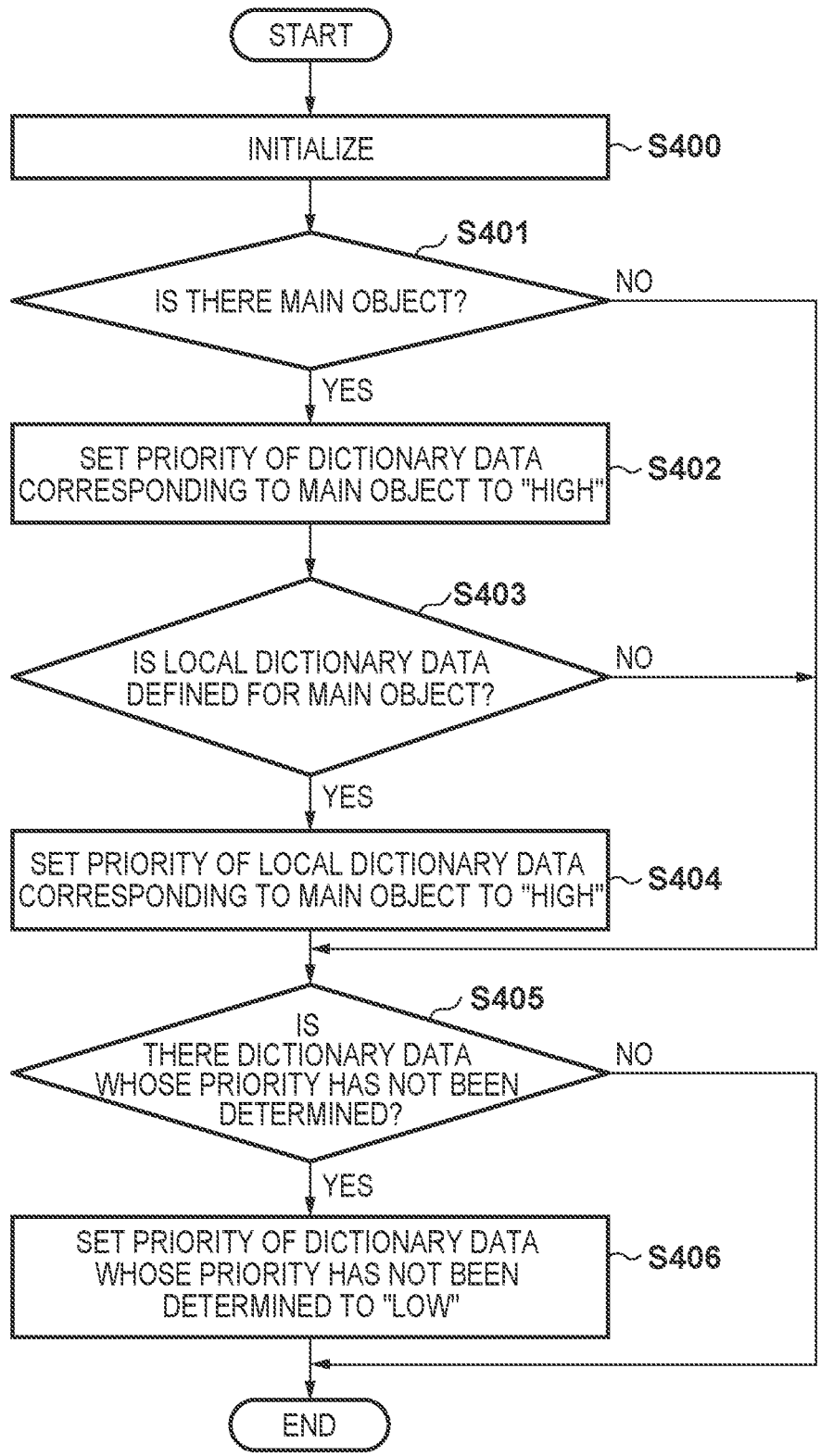
FIG. 4 is a flowchart of dictionary data priority calculation processing in the first embodiment.
Figure 5:
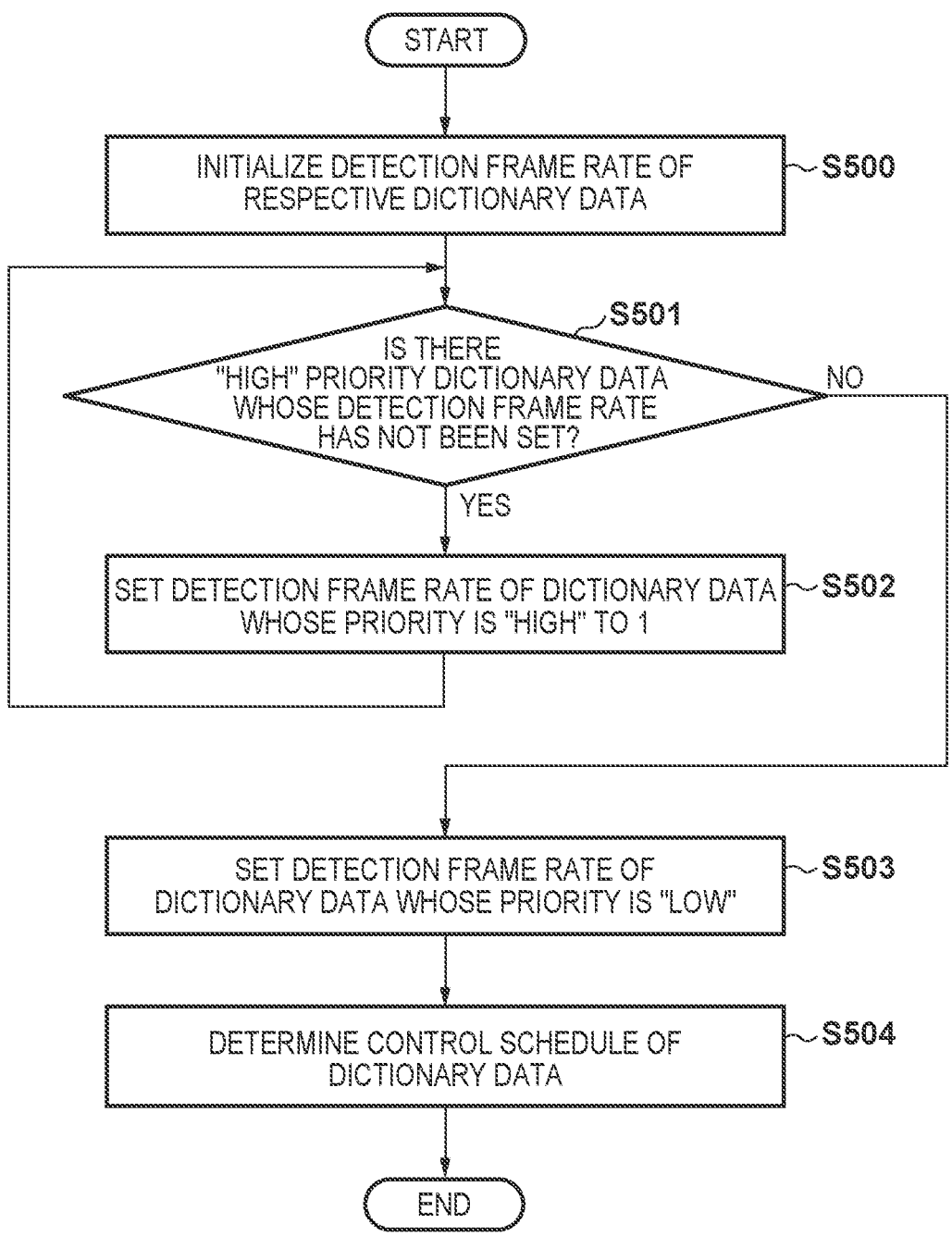
FIG. 5 is a flowchart for determining a dictionary data switching control method in the first embodiment.

The priorities and detection cycles of respective dictionary data are determined by both steps S308 and S309 of FIG. 4 and FIG. 5, on the basis of the conditions in FIG. 6A. The results are shown in FIG. 6B. FIG. 6B shows the detection cycles of respective dictionaries determined according to the main object that is detected.

In the case where an object is not detected, the detection cycles of all the dictionary data are uniformly set to 2 [frame/detection]. On the other hand, in the case where a person is detected as an object, the detection cycle for only the dictionary data regarding person is set to 1 [frame/detection]. Similarly, in the case where another object is detected, the detection cycle for only the dictionary data corresponding to the detected object is set to 1 [frame/detection].

Figure 7:
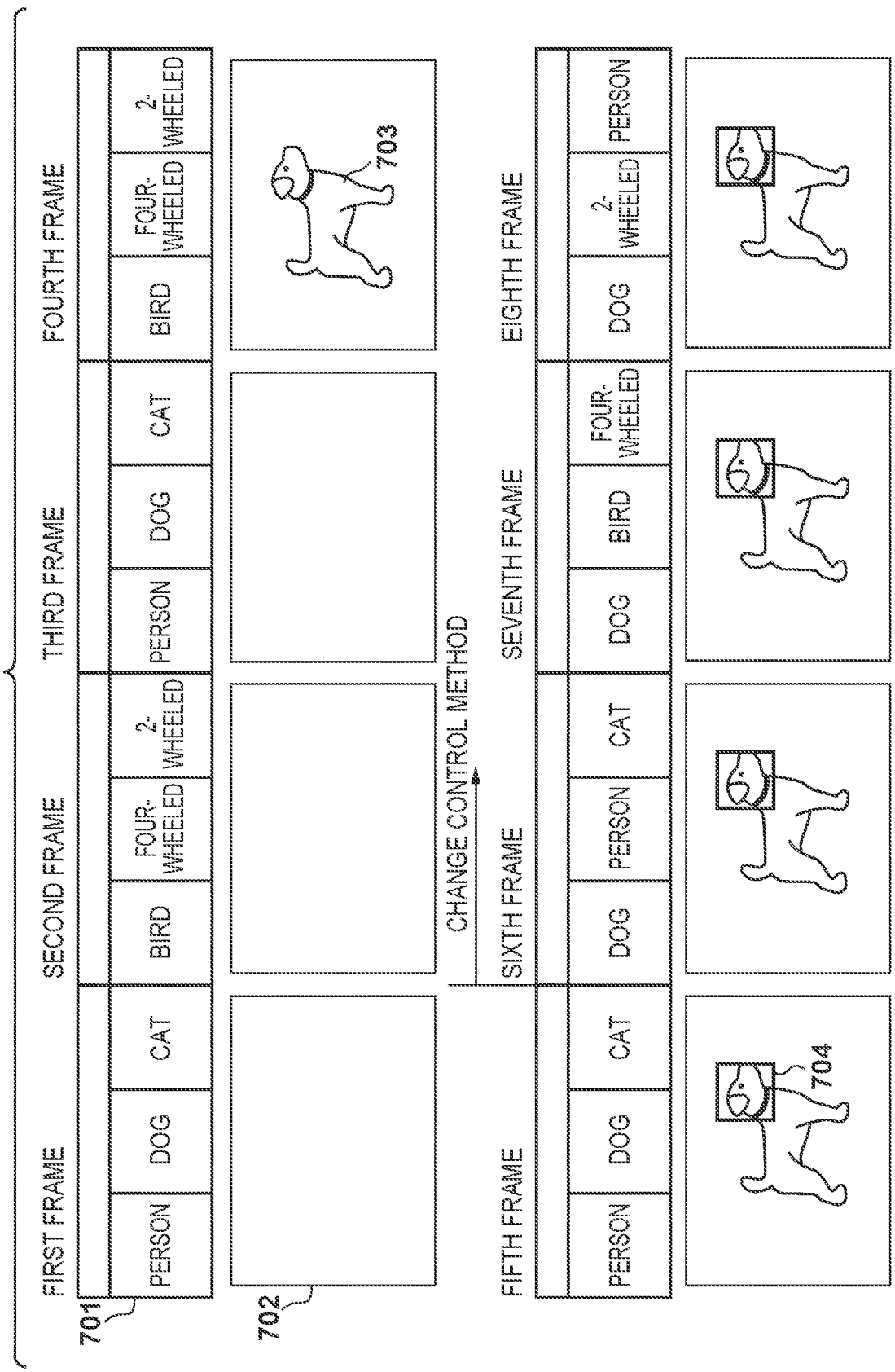
FIG. 7 is a diagram showing an example of control of dictionary data envisaging a specific case example.

Next, an example of control of dictionary data envisaging a case example where a dog 703 is detected during continuous frames will be illustrated using FIG. 7. In FIG. 7, in each frame, reference numeral 701 denotes dictionary data that has been scheduled and 702 denotes a shot image that is input to the detector 213.

In the example in FIG. 7, an object is not detected in the first to fifth frames, and thus the detection cycles of all the dictionary data are set to 2 [frame/detection]. In the fourth frame the dog 703 appears in the frame, and during the fifth frame a face 704 of the dog is output as a detection result, and "dog" is determined as the main object. From the sixth frame onward, the detection cycle of the dictionary data of dog is controlled at 1 [frame/detection], and the other dictionary data (person, cat, bird, four-wheeled, two-wheeled) is controlled at 2 [frame/detection]. Because the dictionary data corresponding to the main object that is detected is input to the detector 213 in all the frames (per frame from this time) from the sixth frame onward, stable object tracking becomes possible. Dictionary data other than the main object is also input to the detector, and thus even when types of objects other than the main object appears within the shot image, these objects are detectable, and it also becomes possible to change the main object to another type of object.

Next, an example of control of dictionary data in case where there is local dictionary data will be described. FIG. 8A shows the types of dictionary data and processing restrictions on the detector. Also, FIG. 8B shows the detection cycles of respective dictionary data and local dictionary data determined by both steps S308 and S309 of FIGS. 4 and 5. When an object for which local dictionary data is defined is detected as a main object, the local dictionary data is also set to "high" priority, and is controlled at a detection cycle of 1 [frame/detection]. Accordingly, the detection cycle of dictionary data corresponding to objects other than the main object decreases relatively.

Figure 9:
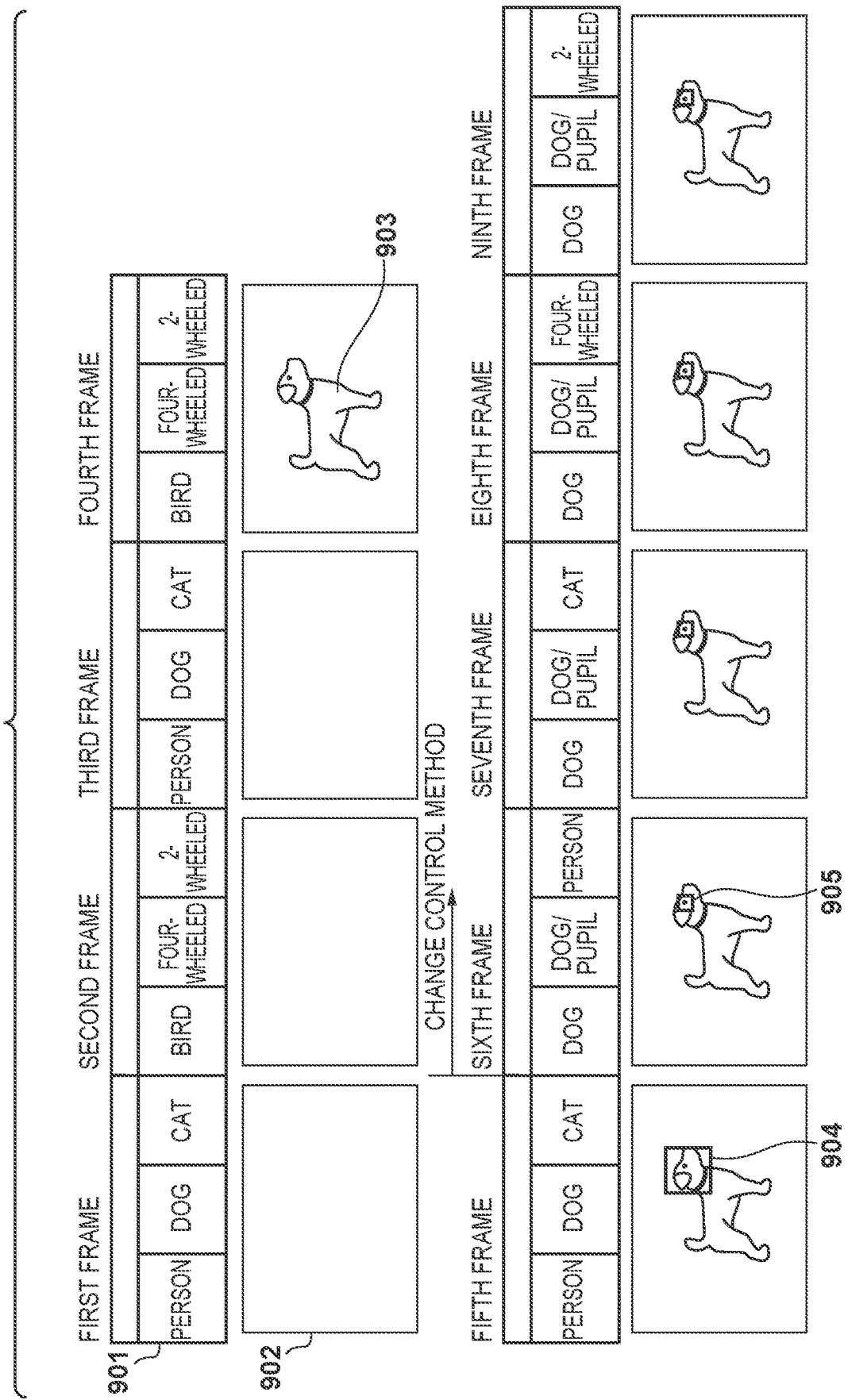
FIG. 9 is a diagram showing an example of control of dictionary data envisaging a specific case example in the case where local dictionary data is defined.

FIG. 9 shows an example of control of dictionary data utilizing the detection cycle of dictionary data determined using FIGS. 8A and 8B. A dog is detected in the fifth frame shown in FIG. 9, and the dictionary data control method is changed from the sixth frame. Corresponding local dictionary data is also input to the detector at a detection cycle of 1 [frame/detection] from the sixth frame, and a pupil 905 serving as a local area of the dog will be detected.

As described above, in the present embodiment, the priorities of respective dictionary data that is used in each frame is dynamically calculated, according to the detection state of objects, in an apparatus having few arithmetic logic circuits constituting the detector compared to the amount of dictionary data and poor processing capacity. By changing the dictionary data control method, stable object tracking becomes possible after a specific object is detected, while being able to detect a plurality of types of objects.

Second Embodiment

Next, a second embodiment of the disclosure will be described. In the first embodiment, the priorities of the respective dictionary data of objects other than the detected main object are relatively lowered uniformly. In the present embodiment, priorities are calculated for the respective dictionary data of objects other than the main object, and the dictionary data to be input to the detector 213 is determined. The superiority or inferiority priorities of respective dictionary data are determined in line with actual use cases.

Taking the case where a dog is the main object as an example, the object that has the most use cases of being shot together with a dog is conceivably people. Conceivable situations include people walking dogs, people cuddling dogs and people playing with dogs, and the priority of the dictionary data of person should conceivably be set to high. On the other hand, because a dog has conceivably few use cases of being shot together with four-wheeled or two-wheeled vehicles, the priority of the dictionary data of four-wheeled or two-wheeled should conceivably be set low.

In actual control, the priorities of respective dictionary data are prepared in advance on the ROM as a design table, based on such a view, and the priorities of the dictionary data are determined with reference to that table according to the state of the detected object.

FIG. 10A shows a specific example of a dictionary data priority table. Here, the priorities of the dictionary data are represented in five levels from 5 (high) to 1 (low). The detection cycles of the respective dictionary data are calculated, based on this table, and the method for controlling dictionary data switching is determined. An example of the detection cycles of respective dictionary data determined based on the priorities of FIG. 10A is shown in FIG. 10B.

Figure 11:
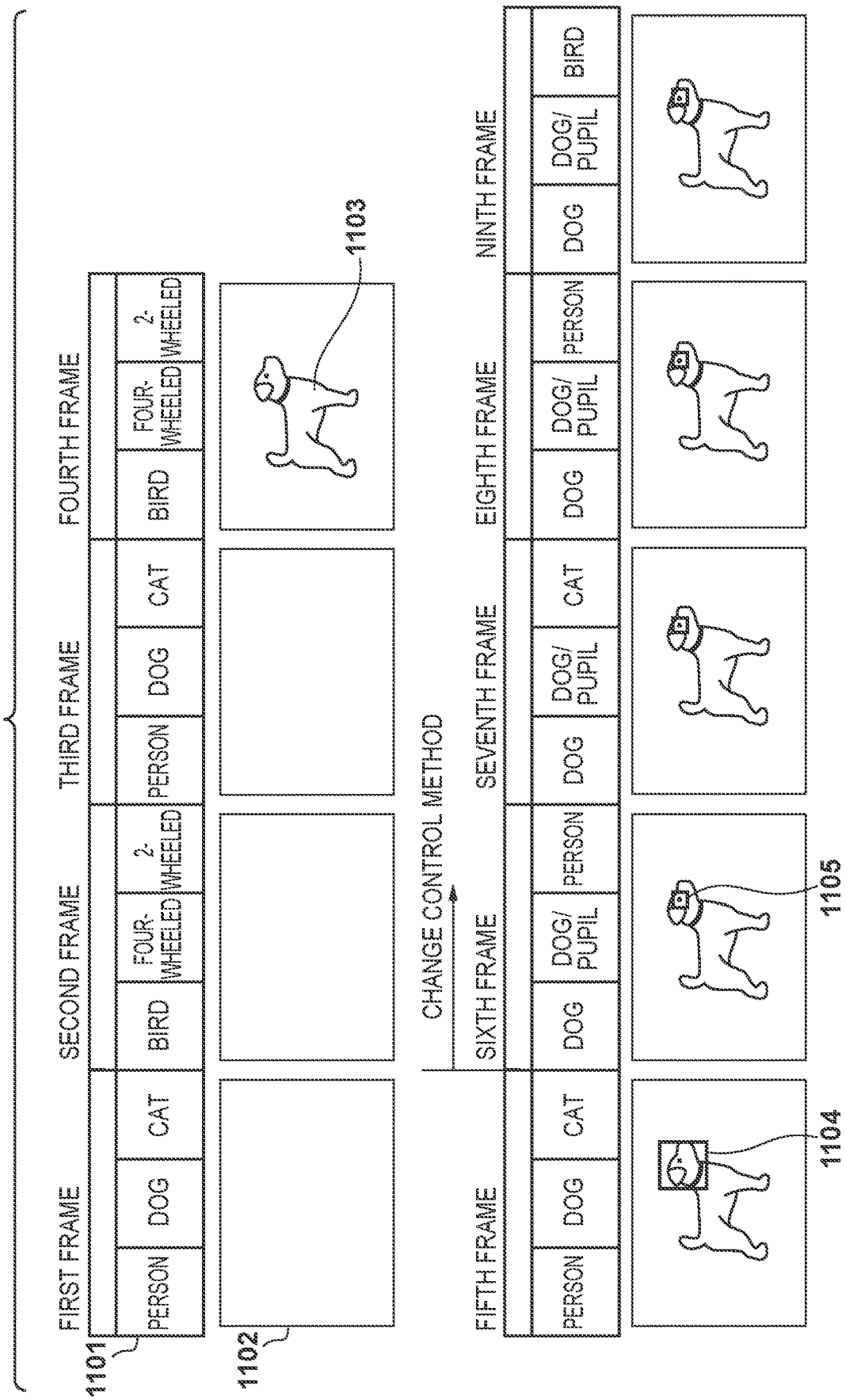
FIG. 11 is a diagram showing an example of control of dictionary data envisaging a specific case example in the second embodiment.

Next, an example of control of dictionary data envisaging the case example where a dog 1103 is detected during continuous frames will be illustrated using FIG. 11. The dog 1103 is detected as an object in the fifth frame, and dictionary data control is changed from the sixth frame. Because dictionary data corresponding to the pupil of a dog serving as a local area of a dog is input to the detector from the sixth frame, a pupil 1105 of the dog is detected. Also, the detection cycles of the dictionary data of objects other than dog are scheduled in line with FIG. 10B.

As described above, in the present embodiment, the priorities of respective dictionary data are determined in line with actual use cases. Thereby, even with an apparatus in which the number of the arithmetic logic circuits constituting the detector and processing capacity are limited, various types of objects can be detected earlier, and changing of the main object can also be performed quicker.

Third Embodiment

Next, a third embodiment of the disclosure will be described. In the third embodiment, the step of calculating the priorities of respective dictionary data shown in FIG. 3 is performed according to past detection histories. The present embodiment differs from the first embodiment only in terms of steps S308, S309 and S311 in FIG. 3, and the remaining processing is the same as the first embodiment.

In the process of step S311 for determining the main object from among detected objects, processing that involves detection information of objects that are detected in the same frame (at the same time) as the main object being accumulated by object type and stored as object detection frequency data is added.

Figure 12A:
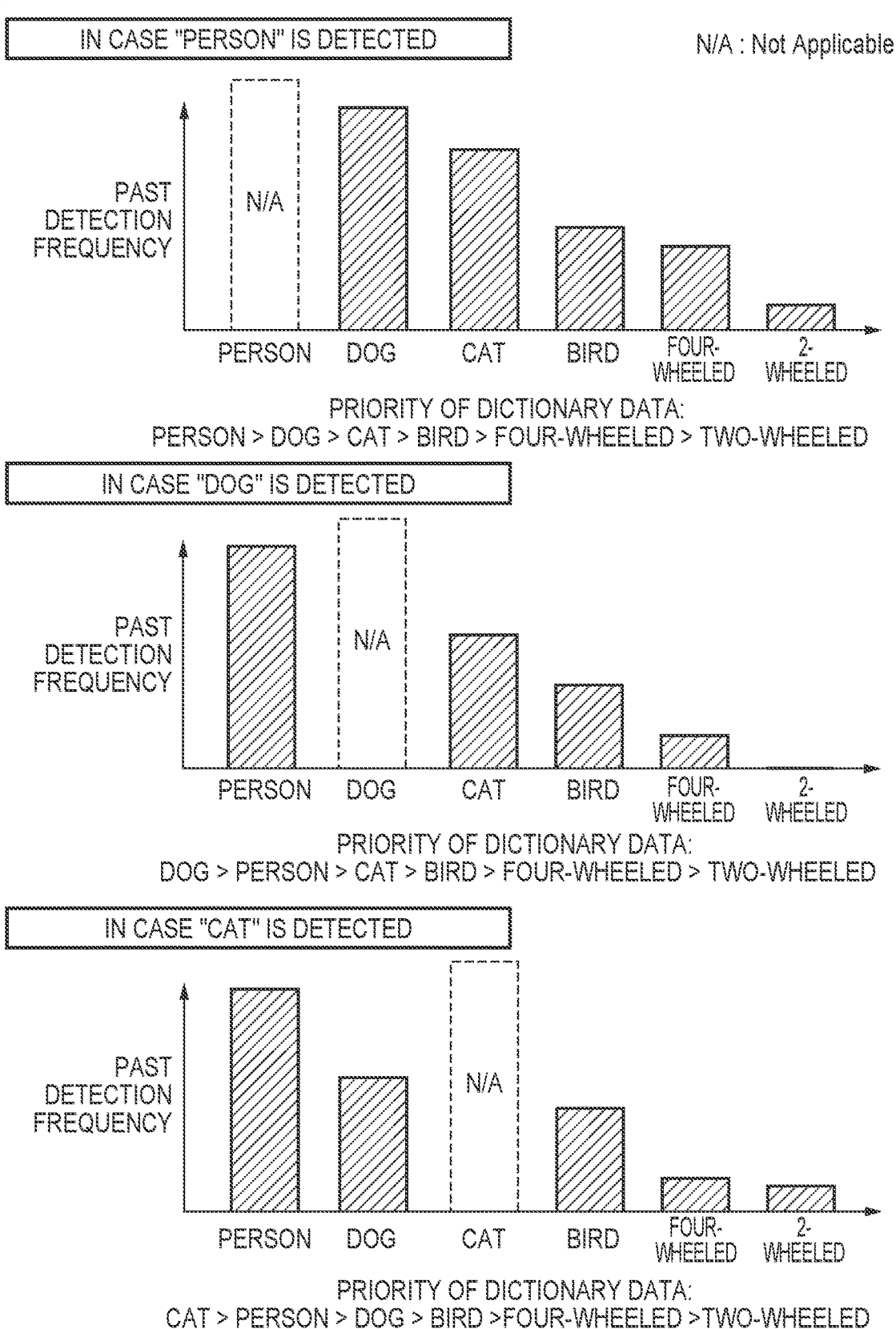

FIGS. 12A and 12B are diagrams showing example object detection frequency data by object type with bar graphs, with the detection frequencies at which the other types of objects were detected within the same frame in the case where a specific object is detected as the main object being represented. The objects serving as detection targets are given as person, dog, cat, bird, four-wheeled, and two-wheeled, similarly to the first embodiment, and the detection frequencies of the other objects in the case where each of these objects is detected as the main object are represented with bar graphs. The detection frequency of the type of object that is detected as the main object is itself not considered here, and is thus marked as N/A (Not Applicable).

Next, in step S308, the object detection frequency data stored in the previous step S311 is referred to, and the priorities of the respective dictionary data in the current object detection are determined, according to the object type detected as the main object at that time. The priorities of the dictionary data of object types having a high detection frequency are set high, and the priorities of the dictionary data of object types having a low detection frequency are set low.

Next, in step S309, the detection cycles of the respective dictionary data are determined based on the priorities of the dictionary data already determined. An example of the determined detection cycles of the respective dictionary data is shown in FIG. 13.

As described above, in the present embodiment, dictionary data control suitable for the user can be performed by determining the priorities of respective dictionary data in line with past object detection frequency data. Accordingly, even with an apparatus in which the number of the arithmetic logic circuits constituting the detector and processing capacity are limited, various types of objects can be detected earlier, and changing of the main object can also be performed quicker.

Fourth Embodiment

Next, a fourth embodiment of the disclosure will be described. An algorithm that, after continuously detecting an object a given number of times or more, employs the detection result is used (henceforth, continuity check) in object detection for purposes such as preventing erroneous detection and the like.

However, in a shooting mode in which immediacy is required in display and tracking control during continuous shooting and the like, a continuity check is not performed, and if an object is detected even once, the detection result is immediately employed as the main object, and reflection on tracking control, dictionary data control and frame display is performed.

However, there is the possibility of erroneous detection with a one-off detection result. For example, there is possibility of erroneous detection such as detecting part of a two-wheeled vehicle as a dog. Even with erroneous detection, if a target object continues to be detected continuously, no major issues occur in tracking control. However, since the detection is erroneous, the detection state is often unstable, increasing the risk of issues occurring in object tracking.

In view of this, in the present embodiment, in a shooting mode in which continuity checks are not performed such as continuous shooting mode, the dictionary data of all the types continues to be applied even after an object is detected once and employed as the main object, and when an object is continuously detected a given number of times or more, that object is reemployed as the correct object. Tracking control, dictionary data control and frame display control also change according to the main object that has been reemployed.

Figure 14:
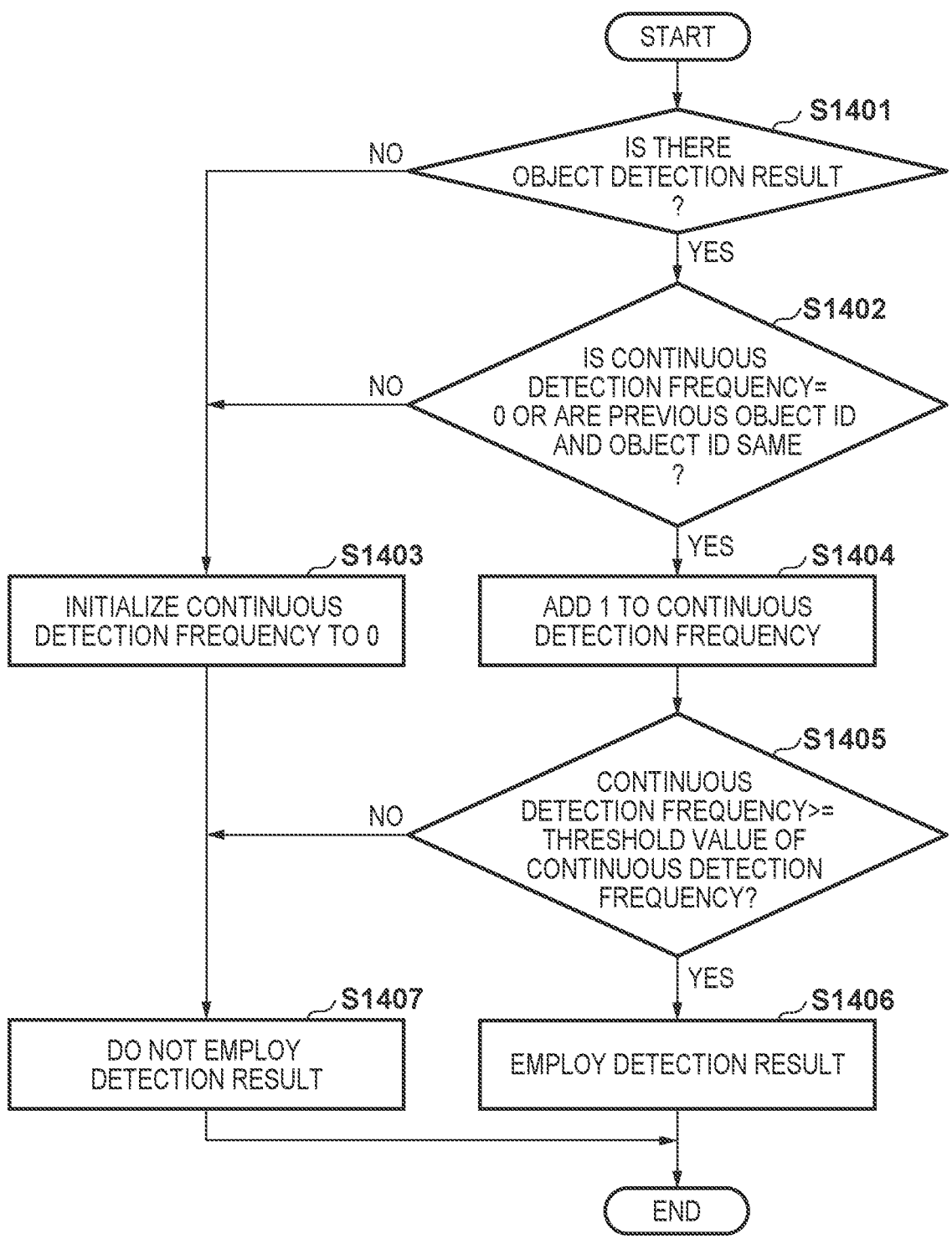
FIG. 14 is a flowchart showing the contents of continuity check processing.

The above continuity check is performed in the main object determining processing of S311 in FIG. 3. The contents of continuity check processing are shown in FIG. 14. As illustrated in FIG. 3, since the flowchart of FIG. 3 is repeatedly performed every frame, the operations of the flowchart of FIG. 14 will also be performed every frame.

In step S1401, it is checked whether there is an object detection result within the input image. If there is an object detection result, the processing advances to step S1402. If there is not an object detection result, the continuous detection frequency is initialized to 0 in step S1403, and a detection result is not employed (step S1407).

Next, it is checked in step S1402 whether the continuous detection frequency is 0 or whether the object ID of the object detected in the previous frame and the object ID of the object detected in the current frame are the same. Correlation processing of objects between frames is performed before continuity check processing, and associated using the object ID. If the continuous detection frequency is 0, the detection result is the first detection result, and the processing advances to step S1404. Alternatively, if the previous object ID and the current object ID match, the processing similarly advances to step S1404. For example, if the condition that the previous object ID and the current object ID match is satisfied, the processing advances to step S1404, even when the continuous detection frequency is 1 or more. If neither of the aforementioned conditions is satisfied, the processing advances to step S1403.

In step S1403, the continuous detection frequency is initialized to 0, and a detection result in this case is not employed due to step S1407.

In step S1404, 1 is added to the continuous detection frequency, and the processing advances to step S1405. The continuous detection frequency is stored in a memory or the like whenever an iteration of the operations of FIG. 14 is performed. If the condition in step S1402 of FIG. 14 that the previous object ID and the current object ID match continues for a plurality of frames, the continuous detection frequency is counted up in the above memory.

Next, in step S1405, it is checked whether the continuous detection frequency is greater than or equal to the threshold value of the continuous detection frequency. In a shooting mode in which immediacy is required such as continuous shooting, the threshold value of the continuous detection frequency is set to 1 (continuous shooting mode), and otherwise a larger frequency than 1 is set for the threshold value of the continuous detection frequency (normal mode). If the continuous detection frequency exceeds the threshold value of the continuous detection frequency, the processing advances to step S1406, and the detection result at that time is employed, with this detection result being employed as the main object after the continuity check processing of FIG. 14.

If the continuous detection frequency is less than the threshold value of the continuous detection frequency, the processing advances to step S1407, and the detection result at that time is not employed.

Next, the situation addressed in the present embodiment that occurs at times such as the start of continuous shooting will be described using FIG. 15.

Figure 15:
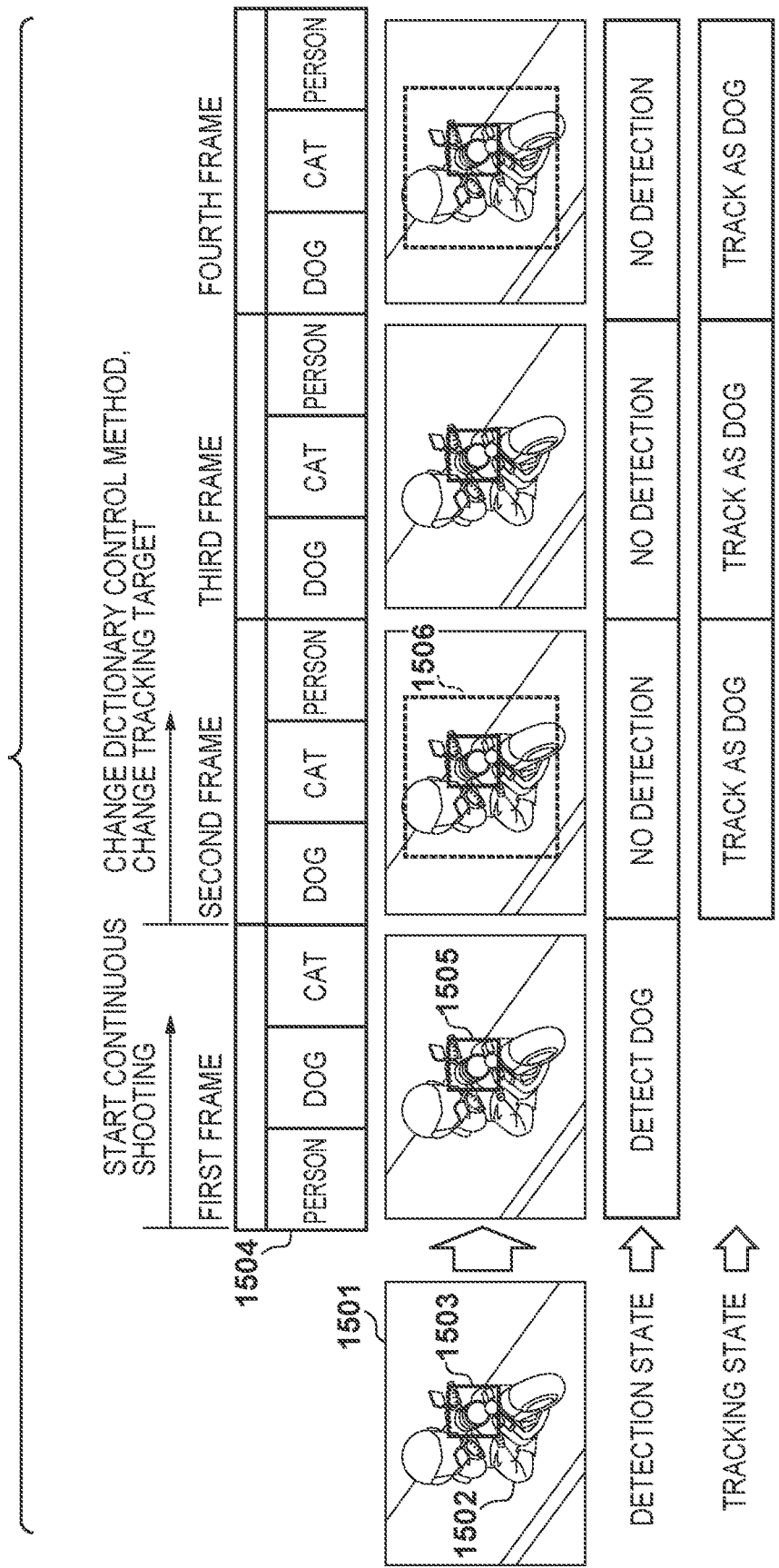
FIG. 15 is a diagram showing a situation that occurs at times such as the start of continuous shooting.

In FIG. 15, images 1501 and 1502 show an input image shot of a two-wheeled vehicle, and a frame 1503 represents an AF frame. Also, the detection state and tracking state of the respective image frames are displayed below the input image. In the input image 1501, when continuous shooting is started in the state where there is no main object, object detection is performed in the portion of the AF frame 1503, and subsequently tracking is performed on the detected object with the entire angle of view. Data 1504 represents dictionary data that is input in the respective image frames. In this example, the case where three pieces of dictionary data can be set for one frame is assumed.

In FIG. 15, a part of the two-wheeled vehicle is erroneously detected as a dog 1505 in the first frame, and from the second frame onward the detection result of the dog 1505 is selected as the main object and tracking is performed. The correct detection result in this image is two-wheeled, but since control for raising the priority of the dictionary data of dog is performed from the second frame onward, the dictionary data of two-wheeled and four-wheeled vehicles is not set. Accordingly, the target object cannot be redetected as two-wheeled. The control concept in the present embodiment that solves this issue is shown in FIGS. 16A to 16C.

Figure 16A:
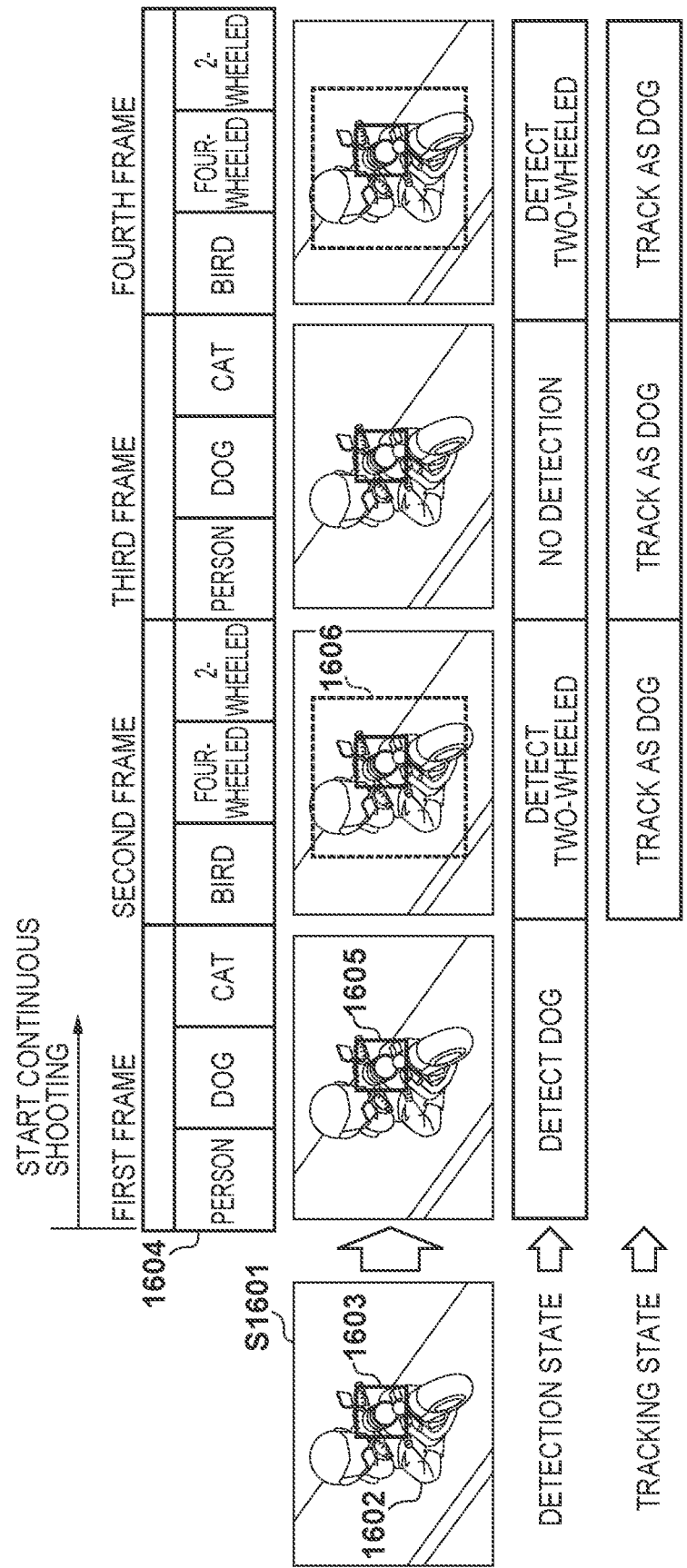
FIGS. 16A to 16C are diagrams showing a control concept for solving the situation shown in FIG. 15.
Figure 16B:
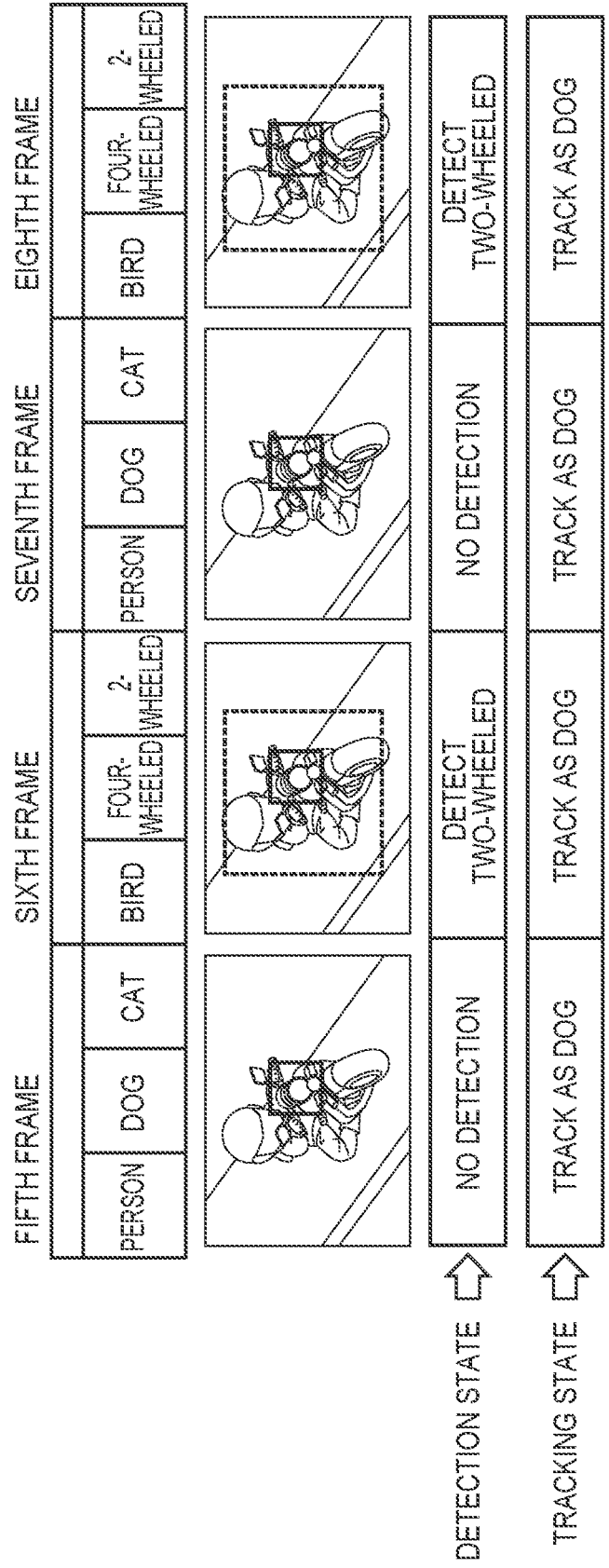
Figure 16C:
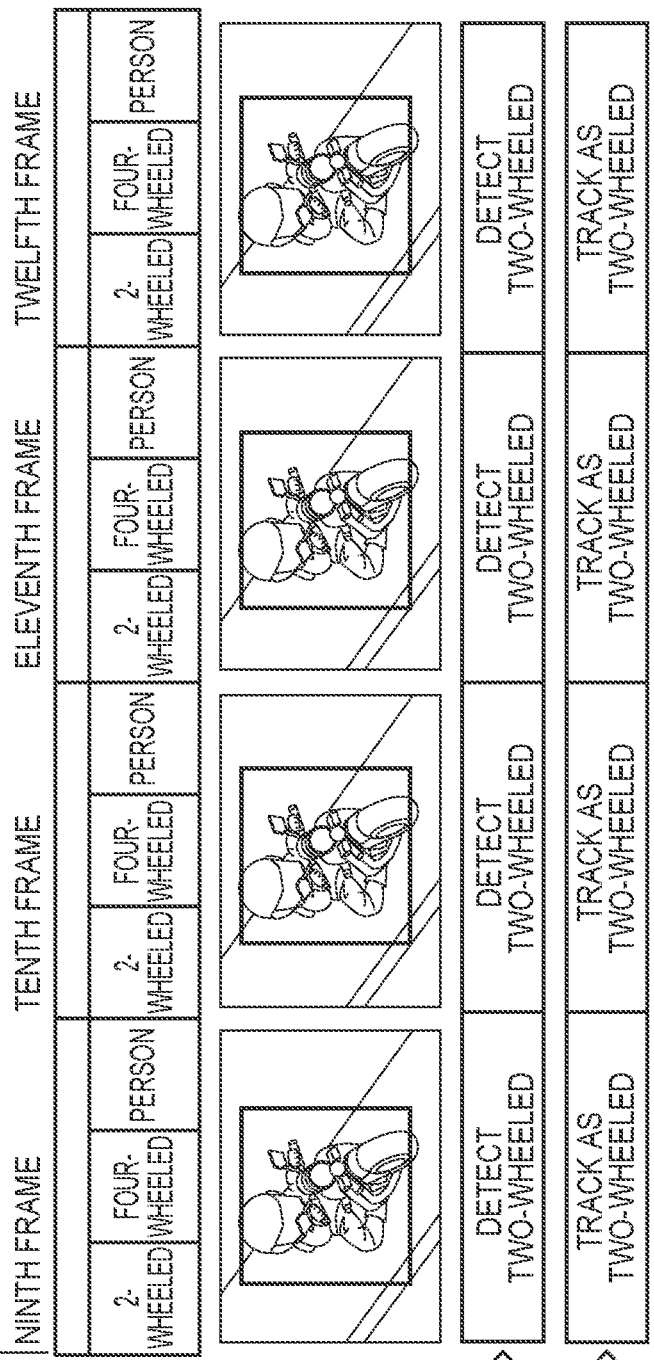

In FIGS. 16A to 16C, even in the case where part of the two-wheeled vehicle is detected as the dog 1505 in the first frame, the same dictionary data control as when there is no main object (the dictionary data of all the classification is set) is performed for a given period from the second frame, rather than performing dictionary data control conforming to dog selected as the main object. In FIGS. 16A to 16C, the detection result of a two-wheeled vehicle 1506, which is the correct detection result, is obtained a plurality of times from the second frame, and the continuous detection frequency exceeds the threshold value (4 in FIGS. 16A to 16C) of the continuous detection frequency in the eighth frame. The main object is then changed from dog to two-wheeled in the ninth frame, and dictionary data control is also changed to conform to two-wheeled. By reemploying the new object detection result detected a plurality of times as the main object, erroneous detection can be corrected while maintaining immediacy during continuous shooting, and the risk of erroneous tracking can be suppressed.

Figure 17:
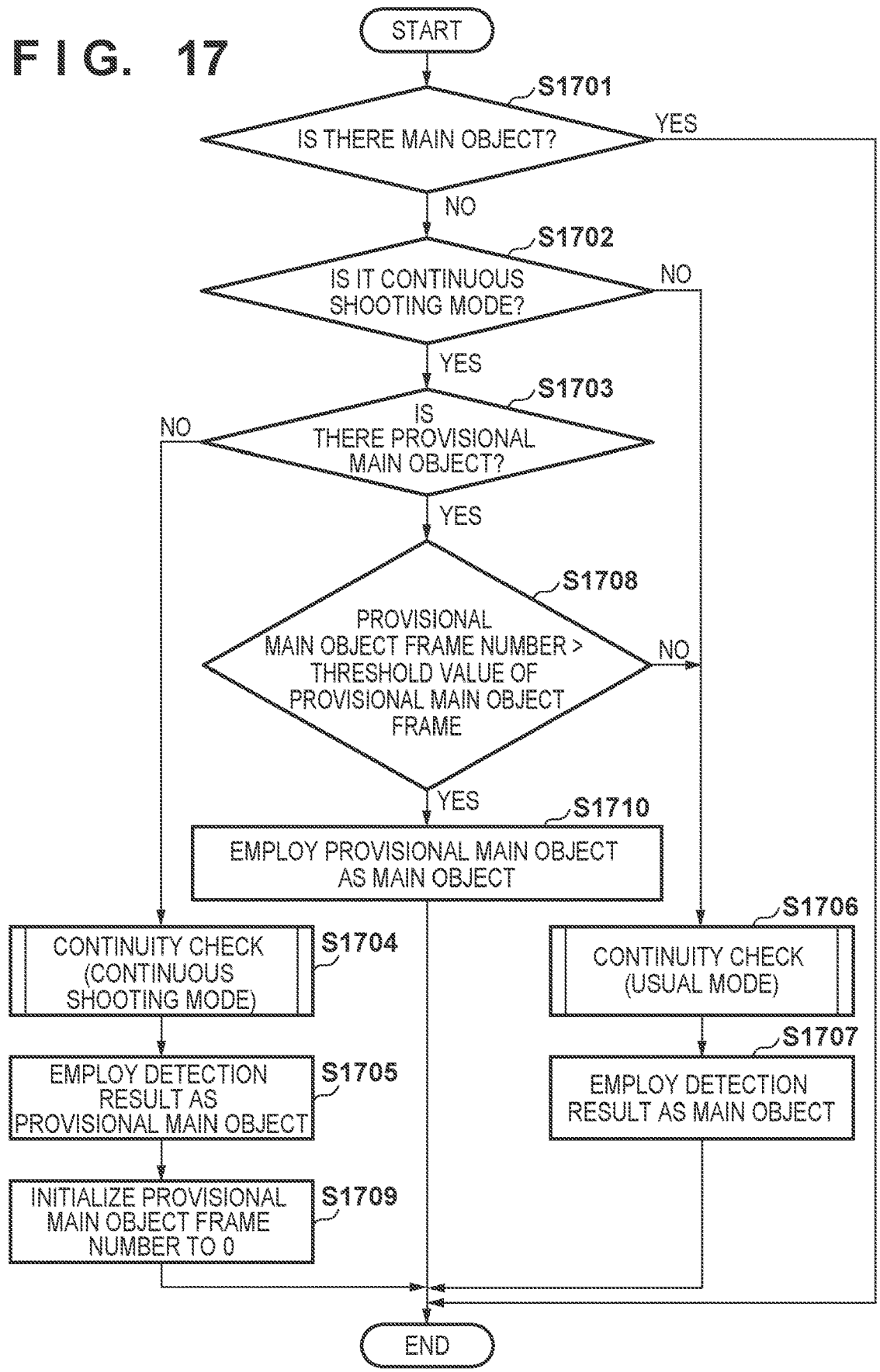
FIG. 17 is a flowchart showing control for realizing the control concept of FIGS. 16A to 16C.

Next, a control flow for realizing the control concept of FIGS. 16A to 16C are shown in FIG. 17. The control flow of FIG. 17 is performed in the main object determining processing of step S311 in FIG. 3. As illustrated in FIG. 3, the flowchart of FIG. 3 is repeatedly performed every frame, and, accordingly, the operations of the flowchart in FIG. 17 are thus also performed every frame.

In FIG. 17, it is judged in step S1701 whether there is already a main object. If there is already a main object, the processing is ended. If there is not a main object, the processing advances to step S1702, and it is judged whether the mode is continuous shooting mode.

If not continuous shooting mode, a continuity check is to be performed in the normal mode, and thus the processing advances to the continuity check (normal mode: continuous detection frequency=4) of step S1706. If the continuous shooting mode, it is checked in step S1703 whether there is a provisional main object. Here, a provisional main object refers to an object selected as the main object without undergoing a continuity check (normal mode: continuous detection frequency=4), such dog taken as the main object in the second to eighth frames in FIGS. 16A to 16C. Although this object, in the case of being a provisional main object, can serve as a tracking target, dictionary data control is performed similarly to dictionary data control in the case where there is no main object, and the dictionary data of all the types is uniformly set.

If there is no provisional object in step S1703, the continuity check (continuous shooting mode: continuous detection frequency=1) of step S1704 is performed, and if there is a detection result in step S1705, that detection result is employed as a provisional main object.

Next, in step S1709, the provisional main target frame number is initialized to 0, and the processing is ended. The provisional main target frame number is obtained by counting the number of image frames from when the provisional main object is set.

Also, if there is a provisional object in step S1703, the processing advances to step S1708.

In step S1708, it is determined whether the provisional main target frame number exceeds a threshold value of the provisional main target frame. If the provisional main target frame number exceeds the threshold value of the provisional main target frame, the provisional main object is changed to the main object in step S1710, given there is no more probable object than the provisional main object, and the processing is ended. Note that, in this flowchart, the provisional main target frame number is stored in a memory or the like whenever an iteration of the operations of FIG. 17 is performed, and the provisional main target frame number is counted up.

If the provisional main target frame number is less than or equal to the threshold value of the provisional main target frame, the processing advances to step S1706. The threshold value of the provisional main target frame is provided in order to restrict the control state of the provisional main object to a given period, and the value thereof is set to be at least greater than or equal to the threshold value of the continuous detection frequency.

Next, the continuity check (normal mode) of step S1706 is performed, and if a detection result exceeding the threshold value of the continuous detection frequency is obtained, that detection result is employed as the main object in step S1707, and the processing is ended.

The series of controls described above can be applied even in the case the main object that was being tracked in continuous shooting is lost sight of, and a new object is redetected.

Figure 18A:
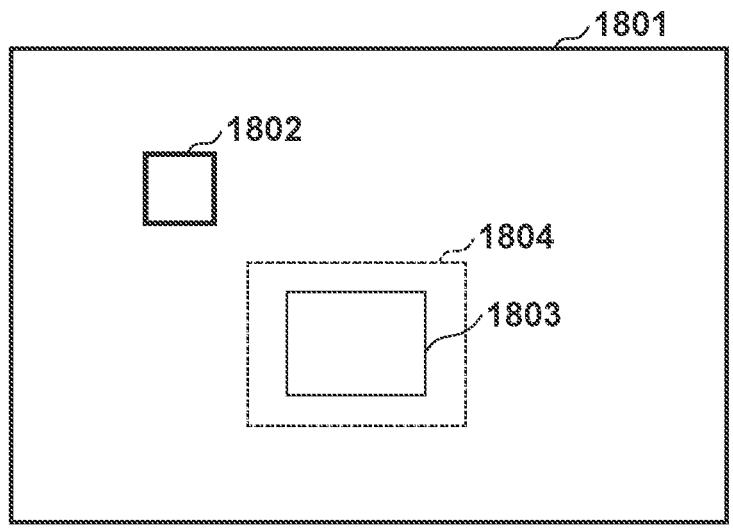
FIGS. 18A to 18C are diagrams showing the positional relationship of objects in the case of reselecting a main object.
Figure 18B:
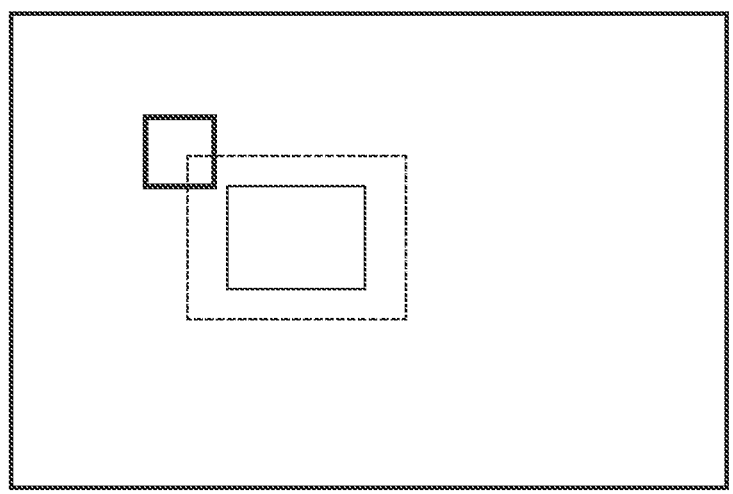
Figure 18C:
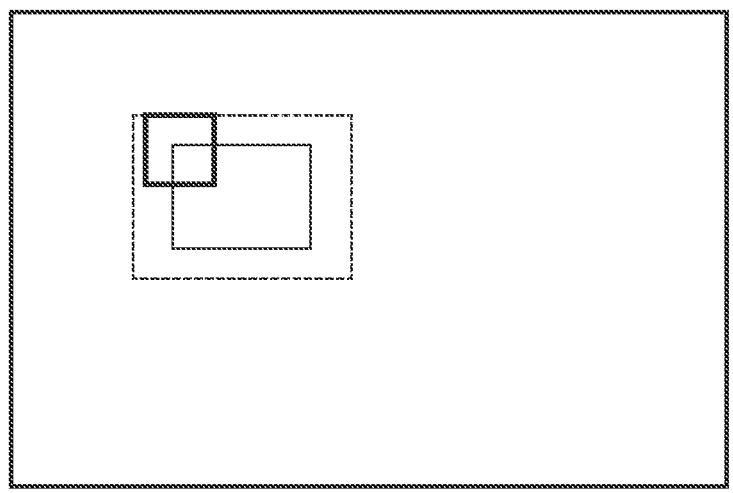

Also, a configuration is adopted in which the object for reselection is only reselected as the main object in the case where the detection area of the object for reselection and the vicinity thereof overlap with the detection area of the provisional object. The positional relationship of objects is shown in FIGS. 18A to 18C. Reference numeral 1801 denotes the image area, 1802 denotes the detection area of the provisional main object, 1803 denotes the detection area of the object for reselection, and 1804 denotes the vicinity of the detection area 1803.

In FIG. 18A, there is no area that overlaps with the detection area 1802, and thus the detection area 1803 is not selected as a new main object.

In FIGS. 18B and 18C, there is an area that overlaps with the detection area 1802, and thus the detection area 1803 is selected as a new main object. The area 1804 is set according to the type of the object for reselection, how much the object has moved previously, and the like. For example, in the case where the object for reselection is an animal, it is envisaged that movement will be fast and there will be a lot of movement during a few frames, and thus the area 1804 is set to be relatively large. In the case where the object for reselection is a person, it is difficult to conceive of there being a lot of movement during a few frames, and thus a method of setting a relatively small area is conceivable.

By adopting this configuration, the risk of erroneously selecting a different object that is in the surrounding area can be reduced.

As described above, in the present embodiment, in a shooting mode in which continuity checks are not performed such as the continuous shooting mode, the dictionary data of all the types continues to be applied even after an object is detected once and employed as the main object, and when an object is continuously detected a given number of times or more, that object is reemployed as the correct object. Tracking control, dictionary data control and frame display control also change according to the main object that has been reemployed. By adopting this configuration, deterioration of tracking performance due to erroneous detection can be suppressed while securing the immediacy of tracking control and frame display control required in the continuous shooting mode.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-026474, filed Feb. 19, 2020, and Japanese Patent Application No. 2020-215656, filed Dec. 24, 2020, which are hereby incorporated by reference herein in their entirety.

What is claimed is:

1. An apparatus comprising:
a storage device configured to store a plurality of dictionary data for respectively detecting a plurality of different objects from an image; and
at least one processor configured to function as:
a detection unit configured to use partial dictionary data of the plurality of dictionary data to detect an object corresponding to the partial dictionary data, with respect to each frame of an image of a plurality of frames obtained by an image capturing device; and
a switching unit configured to switch the dictionary data to be used by the detection unit in the plurality of frames, according to a result of the object detection by the detection unit,
wherein the switching unit switches the dictionary data to be used by the detection unit, so as to use second dictionary data corresponding to detection of a local area of an object corresponding to first dictionary data, in response to the object corresponding to the first dictionary data being detected, and
wherein the switching unit switches the dictionary data to be used by the detection unit, so as to preferentially use the second dictionary data together with the first dictionary data, in a case where the second dictionary data exists.

2. The apparatus according to claim 1,
wherein the detection unit detects a main object from the image.

3. The apparatus according to claim 2,
wherein the main object is an object on which the image capturing device adjusts at least one of focus and exposure.

4. The apparatus according to claim 1,
wherein the switching unit switches the dictionary data to be used by the detection unit, such that, in subsequent frames, dictionary data with respect to which a corresponding object is detected by the detection unit is used at a detection cycle shorter before the object was detected.

5. The apparatus according to claim 1,
wherein the storage device stores a plurality of types of tables for switching the plurality of dictionary data every frame, and
the switching unit switches the dictionary data to be used by the detection unit, using a table set in advance by a user from among the plurality of types of tables.

6. The apparatus according to claim 1,
wherein the switching unit has a priority table for determining priorities of the plurality of dictionary data, according to an object detected by the detection unit.

7. The apparatus according to claim 6,
wherein the switching unit determines the priorities of the plurality of dictionary data, based on the priority table.

8. The apparatus according to claim 1,
wherein the switching unit stores frequency data obtained by accumulating frequencies of types of object detected at a same time as a specific object.

9. The apparatus according to claim 8,
wherein the switching unit determines priorities of the plurality of dictionary data, based on the frequency data.

10. The apparatus according to claim 1,
wherein the plurality of dictionary data is a convolutional neural network learned by machine learning.

11. The apparatus according to claim 1,
wherein, even if a first object is detected and selected as a main object in a specific shooting mode, the switching unit performs switching control of dictionary data, such that, in a case where a second object other than the first object is continuously detected a set number of times or more, the second object is reselected as a main object.

12. The apparatus according to claim 11,
wherein the switching unit performs the switching control, even in a case where a main object that was being tracked is lost sight of and an object is redetected, in the specific shooting mode.

13. The apparatus according to claim 12,
wherein the switching unit reselects the main object, in a case where an area including a detection area of the second object and a vicinity thereof overlap with a detection area of the first object.

14. An apparatus comprising:
an image capturing device configured to capture an image; and
an image processing apparatus including:
a storage device configured to store a plurality of dictionary data for respectively detecting a plurality of different objects from an image; and
at least one processor configured to function as:
a detection unit configured to use partial dictionary data of the plurality of dictionary data to detect an object corresponding to the partial dictionary data, with respect to each frame of an image of a plurality of frames obtained by an image capturing device; and a switching unit configured to switch the dictionary data to be used by the detection unit in the plurality of frames, according to a result of the object detection by the detection unit, wherein the switching unit switches the dictionary data to be used by the detection unit, so as to use second dictionary data corresponding to detection of a local area of an object corresponding to first dictionary data, in response to the object corresponding to the first dictionary data being detected, and wherein the switching unit switches the dictionary data to be used by the detection unit, so as to preferentially use the second dictionary data together with the first dictionary data, in a case where the second dictionary data exists.

15. A method comprising:

using partial dictionary data of a plurality of dictionary data for respectively detecting a plurality of different objects from an image to detect an object corresponding to the partial dictionary data, with respect to each frame of an image of a plurality of frames obtained by an image capturing device; and switching the dictionary data to be used in the detection in the plurality of frames, according to a result of the object detection in the detection, wherein in the switching, the dictionary data to be used by the detection unit is switched so as to use second dictionary data corresponding to detection of a local area of an object corresponding to first dictionary data, in response to the object corresponding to the first dictionary data being detected, and wherein in the switching, the dictionary data to be used by the detection unit is switched so as to preferentially use the second dictionary data together with the first dictionary data, in a case where the second dictionary data exists.

16. A non-transitory computer-readable storage medium storing a computer program for causing a computer to execute a method, the method comprising:

using partial dictionary data of a plurality of dictionary data for respectively detecting a plurality of different objects from an image to detect an object corresponding to the partial dictionary data, with respect to each frame of an image of a plurality of frames obtained by an image capturing device; and switching the dictionary data to be used in the detection in the plurality of frames, according to a result of the object detection in the detection, wherein in the switching, the dictionary data to be used by the detection unit is switched so as to use second dictionary data corresponding to detection of a local area of an object corresponding to first dictionary data, in response to the object corresponding to the first dictionary data being detected, and wherein in the switching, the dictionary data to be used by the detection unit is switched so as to preferentially use the second dictionary data together with the first dictionary data, in a case where the second dictionary data exists.

17. An apparatus comprising:

a storage device configured to store a plurality of dictionary data for respectively detecting a plurality of different objects from an image; and at least one processor configured to function as:

a detection unit configured to use partial dictionary data of the plurality of dictionary data to detect an object corresponding to the partial dictionary data, with respect to each frame of an image of a plurality of frames obtained by an image capturing device; and a switching unit configured to switch the dictionary data to be used by the detection unit in the plurality of frames, according to a result of the object detection by the detection unit, wherein, even if a first object is detected and selected as a main object in a specific shooting mode, the switching unit performs switching control of dictionary data, such that, in a case where a second object other than the first object is continuously detected a set number of times or more, the second object is reselected as a main object.

18. A method comprising:

using partial dictionary data of a plurality of dictionary data for respectively detecting a plurality of different objects from an image to detect an object corresponding to the partial dictionary data, with respect to each frame of an image of a plurality of frames obtained by an image capturing device; and switching the dictionary data to be used in the detection in the plurality of frames, according to a result of the object detection in the detection, wherein, even if a first object is detected and selected as a main object in a specific shooting mode, in the switching, switching control of dictionary data is performed, such that, in a case where a second object other than the first object is continuously detected a set number of times or more, the second object is reselected as a main object.

* * * * *